US 8,437,809 B2

(12) United States Patent
Chishima et al.

(10) Patent No.: US 8,437,809 B2
(45) Date of Patent: May 7, 2013

(54) MOBILE COMMUNICATION TERMINAL AND CONTROL METHOD THEREOF

(75) Inventors: Makoto Chishima, Yokohama (JP); Tetsuya Takenaka, Yokohama (JP); Ryuta Fujisawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 94 days.

(21) Appl. No.: 12/593,579

(22) PCT Filed: Mar. 27, 2008

(86) PCT No.: PCT/JP2008/055954
§ 371 (c)(1),
(2), (4) Date: Feb. 2, 2010

(87) PCT Pub. No.: WO2008/123379
PCT Pub. Date: Oct. 16, 2008

(65) Prior Publication Data
US 2010/0137023 A1    Jun. 3, 2010

(30) Foreign Application Priority Data

| Mar. 28, 2007 | (JP) | 2007-085467 |
| Mar. 28, 2007 | (JP) | 2007-085485 |
| Mar. 28, 2007 | (JP) | 2007-085654 |
| Feb. 27, 2008 | (JP) | 2008-046666 |
| Feb. 27, 2008 | (JP) | 2008-046668 |
| Feb. 27, 2008 | (JP) | 2008-046674 |
| Feb. 28, 2008 | (JP) | 2008-047953 |
| Feb. 28, 2008 | (JP) | 2008-047993 |
| Feb. 28, 2008 | (JP) | 2008-048022 |
| Feb. 28, 2008 | (JP) | 2008-048147 |
| Feb. 28, 2008 | (JP) | 2008-048151 |
| Feb. 28, 2008 | (JP) | 2008-048189 |
| Feb. 28, 2008 | (JP) | 2008-048287 |
| Feb. 28, 2008 | (JP) | 2008-048288 |
| Feb. 28, 2008 | (JP) | 2008-048371 |

(51) Int. Cl.
*H04B 1/38* (2006.01)
*H04B 1/04* (2006.01)

(52) U.S. Cl.
USPC .................. 455/574; 455/127.4; 455/127.5

(58) Field of Classification Search ............ 455/127.4, 455/127.5, 574
See application file for complete search history.

(56) References Cited

U.S. PATENT DOCUMENTS 5,392,462 A    2/1995    Komaki ................ 455/89
(Continued)

FOREIGN PATENT DOCUMENTS

JP    05-014258    1/1993
(Continued)

OTHER PUBLICATIONS

U.S. office action dated Aug. 23, 2012 issued in related U.S. Appl. No. 12/665,694.

(Continued)

*Primary Examiner* — Temica M Beamer
*Assistant Examiner* — Joel Ajayi
(74) *Attorney, Agent, or Firm* — DLA Piper LLP (US)

(57) ABSTRACT

A mobile communication terminal in accordance with the present invention includes a first wireless communication unit 102 corresponding to a first wireless communication system, an interface 107 detachably connecting an external apparatus 200, a determination unit 111 for determining whether or not the external apparatus 200 connected to the interface 107 corresponds to a second wireless communication system and is a second wireless communication unit 202 consuming less power than the first wireless communication unit 102, a battery voltage detection unit 104 for detecting battery voltage of a power supply unit 103 containing a battery and a control unit 111 for controlling the first wireless communication unit 102 to be in a disabled state when the first wireless communication unit 102 is communicating and the battery voltage detected by the battery voltage detection unit 104 is equal to or less than the predetermined value in the case where connection of the second wireless communication unit 202 is determined by the determination unit 111. Thus multimode communication depending on the battery voltage can be executed efficiently without causing unexpected circumstances to the user.

64 Claims, 15 Drawing Sheets

U.S. PATENT DOCUMENTS

| | | | |
|---|---|---|---|
| 6,389,269 B1 * | 5/2002 | Nanni et al. | 455/93 |
| 7,324,835 B2 | 1/2008 | Chen et al. | |
| 7,991,399 B2 | 8/2011 | Ganesan | |
| 2002/0102987 A1 * | 8/2002 | Souisse et al. | 455/454 |
| 2004/0101744 A1 | 5/2004 | Suzuki | |
| 2005/0101350 A1 | 5/2005 | Wang | |
| 2005/0159179 A1 * | 7/2005 | Sainton et al. | 455/552.1 |
| 2005/0165916 A1 | 7/2005 | Cromer et al. | |
| 2005/0288003 A1 | 12/2005 | Matsumura | |
| 2006/0223465 A1 * | 10/2006 | Akiba et al. | 455/127.4 |
| 2007/0106668 A1 | 5/2007 | Maegawa et al. | |

FOREIGN PATENT DOCUMENTS

| | | |
|---|---|---|
| JP | 05-091017 | 4/1993 |
| JP | 10-210550 | 8/1998 |
| JP | 11-252006 | 9/1999 |
| JP | 2004-235863 | 8/2004 |
| JP | 2007115192 A | 5/2007 |

OTHER PUBLICATIONS

Japanese language office action dated Apr. 3, 2012 and its English translation issued in corresponding Japanese application 2008047953.

U.S. office action dated Sep. 6, 2012 issued in related U.S. Appl. No. 12/919,401.

U.S. final office action dated Jan. 18, 2013 issued in related U.S. Appl. No. 12/665,694 cites the U.S. patent application publication listed above.

U.S. office action dated Feb. 8, 2013 issued in related U.S. Appl. No. 12/919,401 cites the U.S. patent application publication listed above.

* cited by examiner

MOBILE COMMUNICATION TERMINAL AND CONTROL METHOD THEREOF

CROSS REFERENCE TO RELATED APPLICATION

This application is a national stage of international application No. PCT/JP2008/055954 filed on Mar. 27, 2008, which also claims priority to and the benefit of Japanese Patent Application No. 2008-46666 (filed Feb. 27, 2007) which claims priority to and the benefit of Japanese Patent Application No. 2007-085485 (filed on Mar. 28, 2007), Japanese Patent Application No. 2008-46674 (filed Feb. 27, 2008) which claims priority to and the benefit of Japanese Patent application No. 2007-85467 (filed on Mar. 28, 2007), Japanese Patent Application No. 2008-46668 (filed on Feb. 27, 2008) which claims priority to and the benefit of Japanese Patent Application No. 2007-85654 (filed on Mar. 28, 2007) and Japanese Patent Application Nos. 2008-47993, 2008-48022, 2008-47953, 2008-48371, 2008-48288, 2008-48147, 2008-48189, 2008-48287 and 2008-48151 filed on Feb. 28, 2008, the whole contents of which are incorporated herein by reference.

TECHNICAL FIELD

The present invention relates to a mobile communication terminal and a control method thereof.

BACKGROUND ART

Various wireless communication systems such as PDC (Personal Digital Cellular), W-CDMA (Wideband Code Division Multiple Access), cdma2000 1x, PHS (Personal Handy-phone System), wireless LAN (Local Area Network) and Bluetooth have conventionally been operated as a mobile communication system. In addition, standardization of high-speed wireless communication such as WiMAX (Worldwide Interoperability for Microwave Access) has been progressed. Each of these wireless communication systems has a different characteristic.

For example, PHS can take many usable terminals per unit area due to small cell area. Therefore it has the advantage of high frequency-use efficiency. In addition, a PHS terminal is required to receive only individual call signals (PCH: Paging Channel) while connecting to a cell station (CS) and its interval is long, thus it has also the advantage of long standby time. However, since the area covered by one cell is small, it has the disadvantage of high possibility of discontinuation of communication when communication is performed while moving at a high speed.

On the other hand, for example, W-CDMA has a wide cell area. Therefore it can be used while moving in a wide range at a high speed. However, a W-CDMA terminal performs despread processing and the like for monitoring incoming calls and a signal level of a cell and the like, therefore its standby time is much shorter than that of the PHS terminal.

Further, with respect to a wireless LAN as typified by widely-used IEEE (Institute for Electrical and Electronics Engineers) 802.11b, hotspots are installed in coffee shops, public facilities and the like and it can communicate at max. 11 Mbps. However, such wireless LAN is provided on the assumption of indoor use, and therefore the cell area is small such as about 10 m in radius.

Moreover, recently, a multimode mobile communication terminal that can use different wireless communication systems seamlessly has been considered. For example, a mobile communication terminal that switches between the wireless communication systems depending on the moving speed of the terminal or depending on a remaining battery level and a determination result of length of standby time in a plurality of wireless communication systems is disclosed in Japanese Patent Application Laid-Open No. 2004-235863.

SUMMARY OF INVENTION

Technical Problems

The conventionally proposed multimode mobile communication terminal is designed on the assumption that a plurality of wireless communication units corresponding to a plurality of wireless communication systems are incorporated in a terminal.

On the other hand, such a multimode mobile communication terminal described above may be constructed to incorporate a wireless communication unit of a wireless communication system, which is a primary section, (hereinafter occasionally referred to as a main system) and to add a wireless communication unit of a wireless communication system such as wireless LAN or Bluetooth, which is a secondary section, (hereinafter occasionally referred to as a sub-system) by inserting an SD card (Secure Digital card) or connecting a USB (Universal Serial Bus) and the like via an interface.

In a mobile communication terminal having such construction, since a sub-system is added via an interface, usually the power required for communication at a sub-system is smaller than that required for communication at a main system. However, since communication systems are independent of each other, the systems can simultaneously execute communication. Because of this, although communication at either one of the systems is enough, communication may be performed simultaneously at both systems. Therefore, in particular, when battery voltage is low, power of the terminal may be turned off due to battery voltage drop, and thus both systems can not perform communication.

For example, power supply may be turned off when a call is performed at a main system to make a phone call while browsing at a sub-system. In this case, browsing at the sub-system may be continued if the main system that consumes greater power than the sub-system is not activated. In the same manner, when the terminal responds to an incoming call at the main system while browsing at the sub-system, the power supply may be turned off. Again, in this case, browsing at the sub-system may be continued if the main system that consumes greater power than the sub-system is not activated.

Further, when the main system starts receiving data of broadcast/multicast services (hereinafter occasionally referred to as BCMCS) according to the schedule while browsing at the sub-system, power may be turned off in the middle of data reception of BCMCS. In this case, because the original remaining battery level is small, it is difficult to acquire the BCMCS data to the end, and it is easily expected that the data have to be acquired later through unicast as well as browsing has to be redone. Therefore it is more beneficial to use a service that a user wants to use now. In this case, if the user refrains from receiving the data of BCMCS at the main system, the power of the terminal is not turned off, and it is possible to continue browsing at the sub-system.

As mentioned above, in a mobile communication terminal capable of adding a sub-system, there is concern that depending on the battery voltage, some operating conditions of the main system and the sub-system may cause unexpected circumstances to the user such as power of the terminal itself.

Therefore, it is an object of the present invention in view of such circumstances to provide a mobile communication terminal and a control method thereof which can efficiently execute multimode communication depending on the battery voltage without causing unexpected circumstances to the user.

Solutions to Problems

In order to achieve the above object, the invention of a mobile communication terminal in accordance with a first aspect includes:

a first wireless communication unit corresponding to a first wireless communication system;

an interface capable of detachably connecting an external apparatus;

a determination unit for determining whether the external apparatus connected to the interface corresponds to a second wireless communication system and is a second wireless communication unit that consumes less power than the first wireless communication unit;

a battery voltage detection unit for detecting battery voltage of a power supply unit containing a battery; and a control unit for controlling the first wireless communication unit to be in a disabled state when the first wireless communication unit is communicating and the battery voltage detected by the battery voltage detection unit is equal to or less than a first predetermined value, in a case where the determination unit determines that the second wireless communication unit is connected.

The invention of a mobile communication terminal in accordance with a second aspect includes:

a first wireless communication unit corresponding to a first wireless communication system;

an interface capable of detachably connecting a second wireless communication unit corresponding to a second wireless communication system and consuming less power than the first wireless communication unit;

a battery voltage detection unit for detecting battery voltage of a power supply unit containing a battery; and a control unit for controlling the first wireless communication unit to be in a disabled state when the first and the second wireless communication units are communicating and the battery voltage detected by the battery voltage detection unit is equal to or less than a fourth predetermined value.

The invention of a mobile communication terminal in accordance with a third aspect includes:

a first wireless communication unit corresponding to a first wireless communication system;

an interface capable of detachably connecting an external apparatus;

a determination unit for determining whether the external apparatus connected to the interface corresponds to a second wireless communication system and is a second wireless communication unit that consumes less power than the first wireless communication unit;

a battery voltage detection unit for detecting battery voltage of a power supply unit containing a battery; and a control unit for controlling the first wireless communication unit to be in a disabled state when the first wireless communication unit is communicating mainly for reception and the battery voltage detected by the battery voltage detection unit is equal to or less than an eighth predetermined value, in a case where the determination unit determines that the second wireless communication unit is connected.

The invention of a mobile communication terminal in accordance with a forth aspect includes:

a first wireless communication unit corresponding to a first wireless communication system;

an interface capable of detachably connecting a second wireless communication unit corresponding to a second wireless communication system and consuming less power than the first wireless communication unit;

a battery voltage detection unit for detecting battery voltage of a power supply unit containing a battery; and a control unit for controlling the first wireless communication unit to be in a disabled state when the battery voltage detected by the battery voltage detection unit is equal to or less than an eleventh predetermined value in a case where the first wireless communication unit is in a standby state of the first wireless communication system and the second wireless communication unit is communicating.

Further, in order to achieve the above object, the invention of a control method of a mobile communication terminal in accordance with a fifth aspect, for controlling a mobile communication terminal including a first wireless communication unit corresponding to a first wireless communication system, an interface detachably connecting an external apparatus and a power supply unit containing a battery, includes:

a determination step of determining whether the external apparatus connected to the interface corresponds to a second wireless communication system and is a second wireless communication unit that consumes less power than the first wireless communication unit;

a communication state detection step of detecting a communication state of the first wireless communication unit;

a battery voltage detection step of detecting battery voltage of the power supply unit; and a control step of controlling the first wireless communication unit to be in a disabled state when it is detected that the first wireless communication unit is communicating at the communication state detection step and the battery voltage detected at the battery voltage detection step is equal to or less than a first predetermined value, in a case where it is determined that the second wireless communication unit is connected at the determination step.

The invention of a control method of a mobile communication terminal in accordance with a sixth aspect, for controlling a mobile communication terminal including a first wireless communication unit corresponding to a first wireless communication system, a second wireless communication unit corresponding to a second wireless communication system and detachably connected via an interface and a power supply unit containing a battery, includes:

a communication state detection step of detecting a communication state of the first and the second wireless communication units;

a battery voltage detection step of detecting battery voltage of the power supply unit; and a control step of controlling the first wireless communication unit to be in a disabled state when it is detected that the first and the second wireless communication units are communicating at the communication state detection step and the battery voltage detected at the battery voltage detection step is equal to or less than a fourth predetermined value.

The invention of a control method of a mobile communication terminal in accordance with a seventh aspect, for controlling a mobile communication terminal including a first wireless communication unit corresponding to a first wireless communication system, an interface detachably connecting an external apparatus and a power supply unit containing a battery, includes:

a determination step of determining whether the external apparatus connected to the interface corresponds to a second wireless communication system and is a second wireless communication unit that consumes less power than the first wireless communication unit;

a communication state detection step of detecting a communication state of the first wireless communication unit;

a battery voltage detection step of detecting battery voltage of the power supply unit; and a control step of controlling the first wireless communication unit to be in a disabled state when it is detected that the first wireless communication unit is communicating mainly for reception at the communication state detection step and the battery voltage detected at the battery voltage detection step is equal to or less than an eighth predetermined value, in a case where it is determined that the second wireless communication unit is connected at the determination step.

The invention of a control method of a mobile communication terminal in accordance with an eighth aspect, for controlling a mobile communication terminal including a first wireless communication unit corresponding to a first wireless communication system, a second wireless communication unit corresponding to a second wireless communication system and detachably connected via an interface and a power supply unit containing a battery, includes:

a communication state detection step of detecting a communication state of the first and the second wireless communication units;

a battery voltage detection step of detecting battery voltage of the power supply unit; and a control step of controlling the first wireless communication unit to be in a disabled state when the battery voltage detected at the battery voltage detection step is equal to or less than an eleventh predetermined value in a case where it is detected that the first wireless communication unit is in a standby state of the first wireless communication system and the second wireless communication unit is communicating at the communication state detection step.

In accordance with a preferred embodiment of the present invention, when a sub-system is added to the mobile communication terminal described above, a user can easily recognize a usable application.

Further, in the mobile communication terminal described above in accordance with the preferred embodiment of the present invention, when battery charge is started due to stoppage of a main communication unit, the main communication unit can appropriately be restored without causing unexpected circumstances to the user.

Moreover, in the mobile communication terminal described above in accordance with the preferred embodiment of the present invention, multimode communication can efficiently be executed depending on the battery voltage while recognizing the remaining battery level easily.

Advantageous Effects on Invention

According to the present invention, it is possible to execute multimode communication depending on the battery voltage without causing unexpected circumstances to the user according to each operating condition of a first wireless communication unit (main system) and an added second wireless communication unit (sub-system).

| REFERENCE SIGNS LIST | |
|---|---|
| 100, 120, 130 | Mobile communication terminal |
| 101 | Antenna |
| 102 | Wireless unit |
| 103 | Power supply unit |
| 104 | Battery voltage detection unit |
| 105 | Operation unit |
| 105a | Power supply button |
| 106 | Display unit |
| 107 | SD I/F |
| 108 | External slot detection unit |
| 109 | ROM |
| 110 | RAM |
| 111 | Control unit |
| 115 | Charger connection unit |
| 116 | Charger detection unit |
| 121 | Infrared communication unit |
| 122 | Camera unit |
| 123 | Non-contact type IC card unit |
| 124 | TV/FM broadcast reception unit |

-continued

REFERENCE SIGNS LIST

| | |
|---|---|
| 125 | External memory unit |
| 200 | SD wireless card |
| 201 | SD I/F |
| 202 | Wireless unit |
| 203 | Antenna |
| 204 | ROM |
| 205 | RAM |
| 206 | Control unit |

DESCRIPTION OF THE PREFERRED EMBODIMENTS

Embodiments of the present invention will be described hereinafter with reference to the drawings.

First Embodiment

Figure 1:
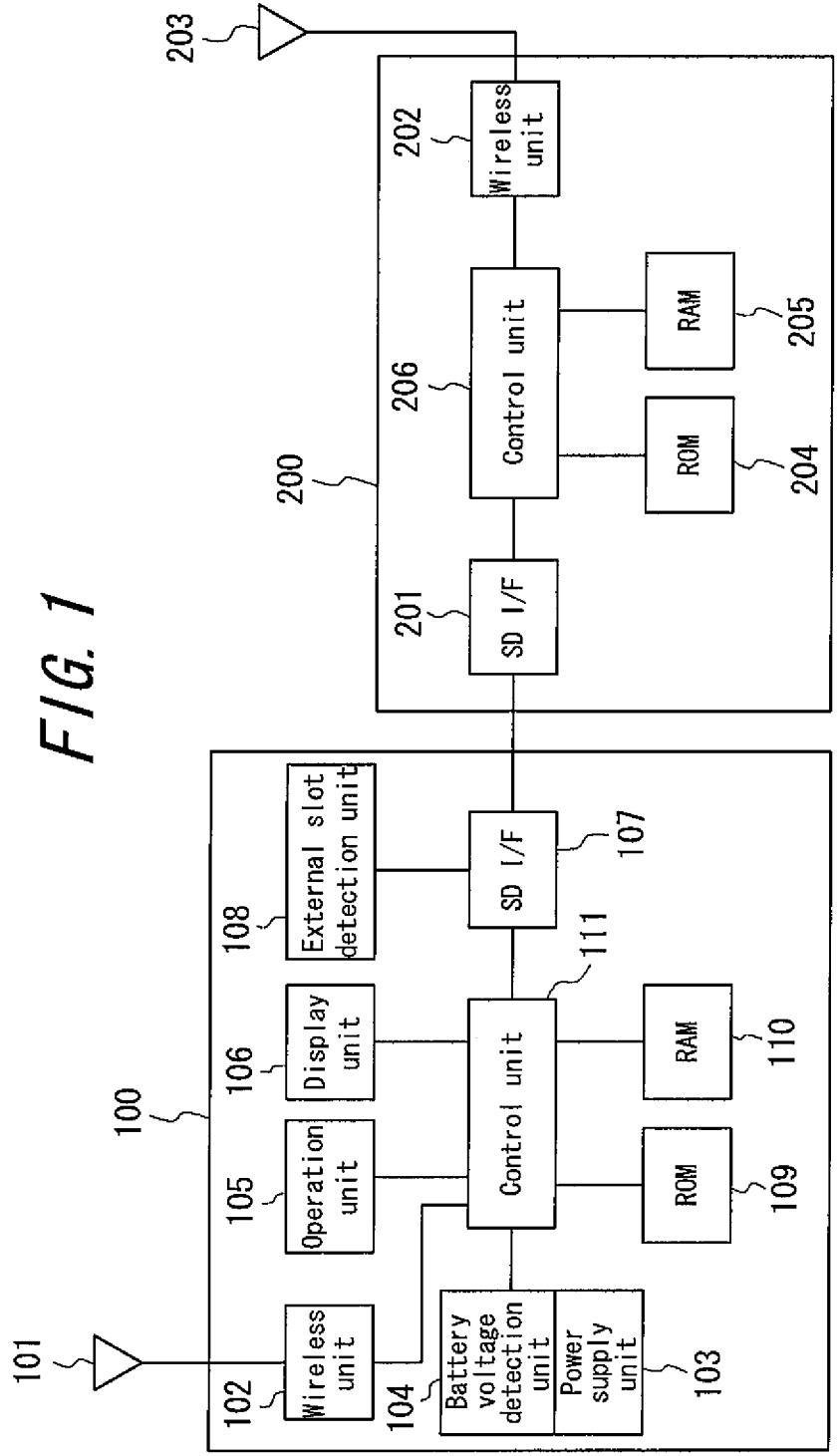
FIG. 1 is a functional block diagram showing a configuration of main units of a mobile communication terminal in accordance with a first embodiment of the present invention.

FIG. 1 is a functional block diagram showing a configuration of main units of a mobile communication terminal in accordance with a first embodiment of the present invention. The mobile communication terminal 100 is a mobile phone terminal and has an antenna 101, a wireless unit 102, a power supply unit 103 containing a battery, a battery voltage detection unit 104 for measuring battery voltage of the power supply unit 103, an operation unit 105 such as an input key or a touch panel, a display unit 106 such as an LCD (Liquid Crystal Display) or an OEL (Organic Electroluminescent), an SD I/F 107 for inserting a card corresponding to SD I/F, an external slot detection unit 108 for detecting insertion of a card corresponding to SD I/F into the SD I/F 107, a ROM 109 and a RAM 110 on which software and the like are written and a control unit 111 for controlling overall operation.

The wireless unit 102 constitutes a first wireless communication unit (hereinafter occasionally referred to as a main communication unit) corresponding to the first wireless communication system (main system) such as cdma 2000 1x or W-CDMA, which is a wireless communication system provided by a carrier, and incorporates a transmission unit and a reception unit and the like, and thus radio waves can be transmitted and received via the antenna 101. Here, for convenience of explanation, the main system is supposed to perform cdma2000 1x communication (hereinafter occasionally referred to as 1x communication) accompanied with transmission and reception and communication in accordance with cdma2000 1xEV-DO. Further, BCMCS (Broadcast/Multicast Services) is performed by receiving data in accordance with cdma2000 1xEV-DO.

In addition, as a card corresponding to the SD I/F, an SD wireless card 200 can be inserted into or removed from the SD I/F 107. The SD wireless card 200 corresponds to a second wireless communication system (sub-system) and has an SD I/F 201, a wireless unit 202 and an antenna 203 constituting the second wireless communication unit (hereinafter occasionally referred to as a sub-communication unit) for performing communication by a sub-system, a ROM 204 and a RAM 205 on which software and the like of the sub-system are written and a control unit 206 for controlling overall operation.

By being inserted into the SD I/F 107 of the mobile communication terminal 100, the SD wireless card 200 is connected to the mobile communication terminal 100, and receives power supplied from the power supply unit 103, and thus communication can be executed by the sub-system independently of the main system. Therefore, the main communication unit and the sub-communication unit can simultaneously execute communication. Here, for convenience of explanation, it is supposed that the SD wireless card 200 performs wireless LAN communication.

In the present embodiment, current consumption during 1x communication of the main system is, for example, 400 mA at a demodulation unit, max. 70 mA at a modulation unit and max. 450 mA at a transmission unit. Therefore, assuming that the battery voltage when the power supply voltage is dropped is 3.4V, for example, the power consumption at this time is 3.4×(40+70+450)=1904 (mW). On the other hand, the SD wireless card 200 of the sub-wireless system is driven at 3.3V, for example, and current consumption during wireless LAN communication is 110 mA in a transmitting mode and 50 mA in a receiving mode, for example. Therefore, assuming that the average current is 80 mA, power consumption is 3.3× 80=264 (mW), which is smaller than that of the 1x communication. In addition, when the 1x communication and the wireless LAN communication are simultaneously performed, total power consumption of the wireless communication terminal 100 is about 700 mA, for example.

Figure 2:
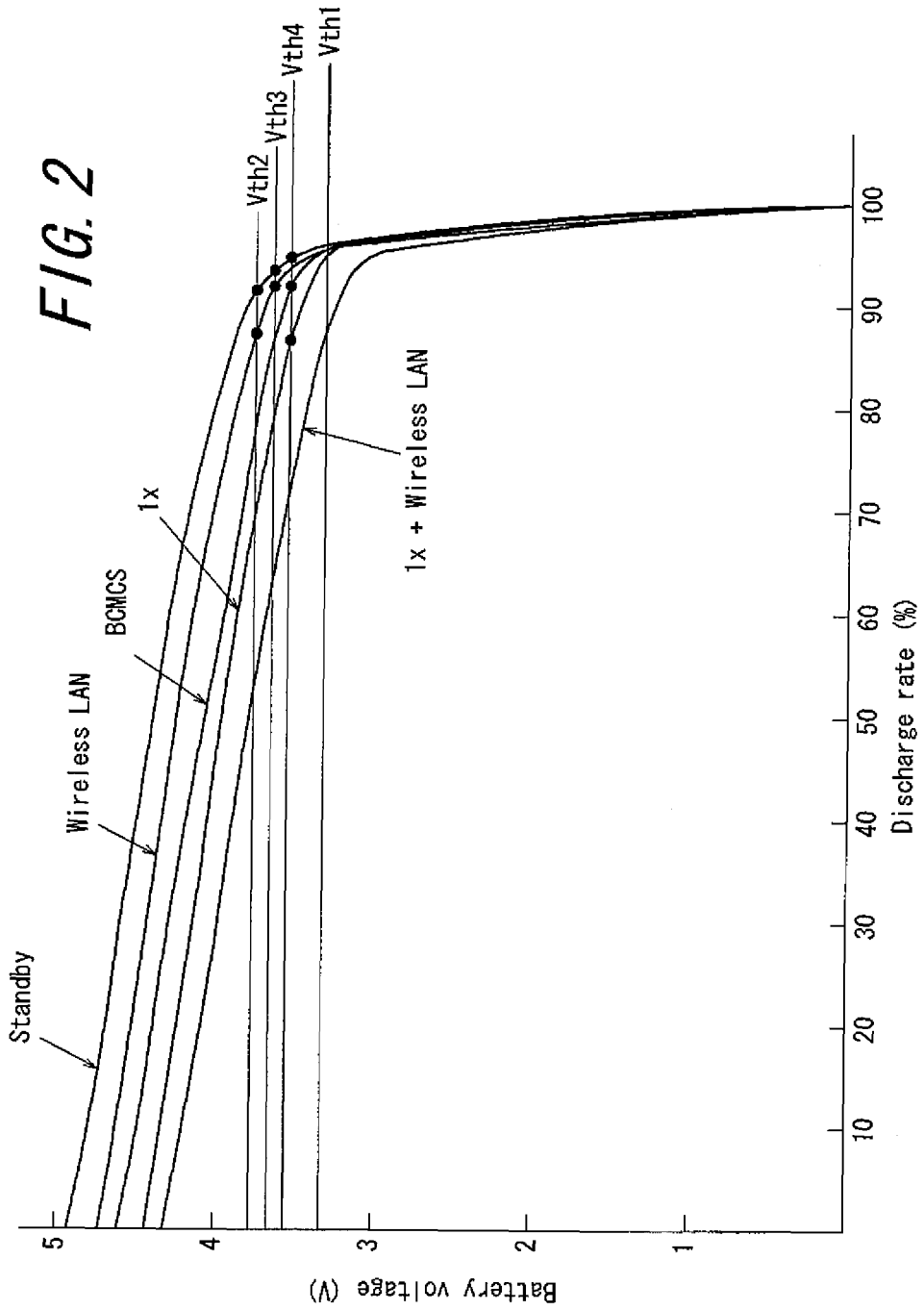
FIG. 2 is a diagram showing an example of a discharge rate—voltage characteristic of a battery constituting a power supply unit shown in FIG. 1.

FIG. 2 shows an example of a discharge rate—voltage characteristic of a battery constituting the power supply unit 103 shown in FIG. 1. Here, shown are the cases where call standby is executed at the main communication unit (standby state), only wireless LAN communication is performed at the sub-communication unit (when using wireless LAN), only data reception of BCMCS is executed at the main communication unit (when performing BCMCS), only 1x communication is executed at the main communication unit (when using 1x), and 1x communication at the main communication unit and wireless LAN communication at the sub-communication unit are simultaneously performed (when using 1x+wireless LAN). It should be noted that call standby is executed at the main communication unit when a wireless LAN is used. In addition, the above mentioned "when using" shows a state in which communication is performed.

As evidenced by FIG. 2, as for a battery, in general, the voltage declines as the discharge rate increases and the voltage drop increases as the current increases. In addition, a lithium-ion battery with a rated voltage of 3.7V is normally used by a mobile phone terminal. A mobile phone terminal of 1x system is designed so that it cannot communicate when battery voltage becomes around 3.4V, for example, and power supply of the terminal itself is automatically turned off when the battery voltage drops to equal to or less than 3.3V. Because of this, in order to show the remaining battery level to the user, the mobile phone terminal of 1x system estimates the remaining battery level based on the battery voltage and displays it on the display unit with 1 to 3 segments of a battery mark, and then shows "Low Batt" when the battery voltage drops to equal to or less than 3.4V.

In the present embodiment, as a battery to be put in the power supply unit 103, a lithium-ion battery with a rated voltage of 3.7V is used, for example. Then the first threshold (Vth1), the second threshold (Vth2), the third threshold (Vth3) and the forth threshold (Vth4) are set relative to the battery voltage. Then operation is controlled based on the comparison between these thresholds and the battery voltage detected by the battery voltage detection unit 104.

Here, Vth1 is the operating voltage limit, Vth2 is the voltage that becomes equal to or less than Vth1 when 1x communication is performed during operation of wireless LAN or standby, Vth3 is the voltage that becomes equal to or less than Vth1 when data reception of BCMCS is performed during operation of wireless LAN or standby, and Vth4 is the voltage that becomes equal to or less than Vth1 when wireless LAN communication is performed during 1x communication (when using 1x), standby or data reception of BCMCS. In the present embodiment, the fourth predetermined value is equivalent to Vth1, the second, third, fifth, sixth, seventh, ninth, tenth and eleventh predetermined values are equivalent to Vth2, and the first and eighth predetermined values are equivalent to Vth4. It should be noted that Vth1, Vth2, Vth3 and Vth4 are the voltage indicating the above concept and it is preferable in practice to use the voltage (predetermined value) with margins which are a little higher than the above mentioned voltages respectively. In the present embodiment, the thresholds are previously stored in the ROM 109 or the RAM 110 on the assumption that Vth1<Vth4<Vth3<Vth2.

Further, the battery voltage of power supply unit 103 is constantly detected by the battery voltage detection unit 104 and is compared with the required threshold by the control unit 111 or is detected at a predetermined cycle and stored in the RAM 110 while being updated, and the control unit 111 compares the latest battery voltage stored in the RAM 110 with the required threshold.

Next, an operation example of the mobile communication terminal 100 in accordance with the present embodiment will be described with reference to each flowchart shown in FIGS. 3 to 7.

Figure 3:
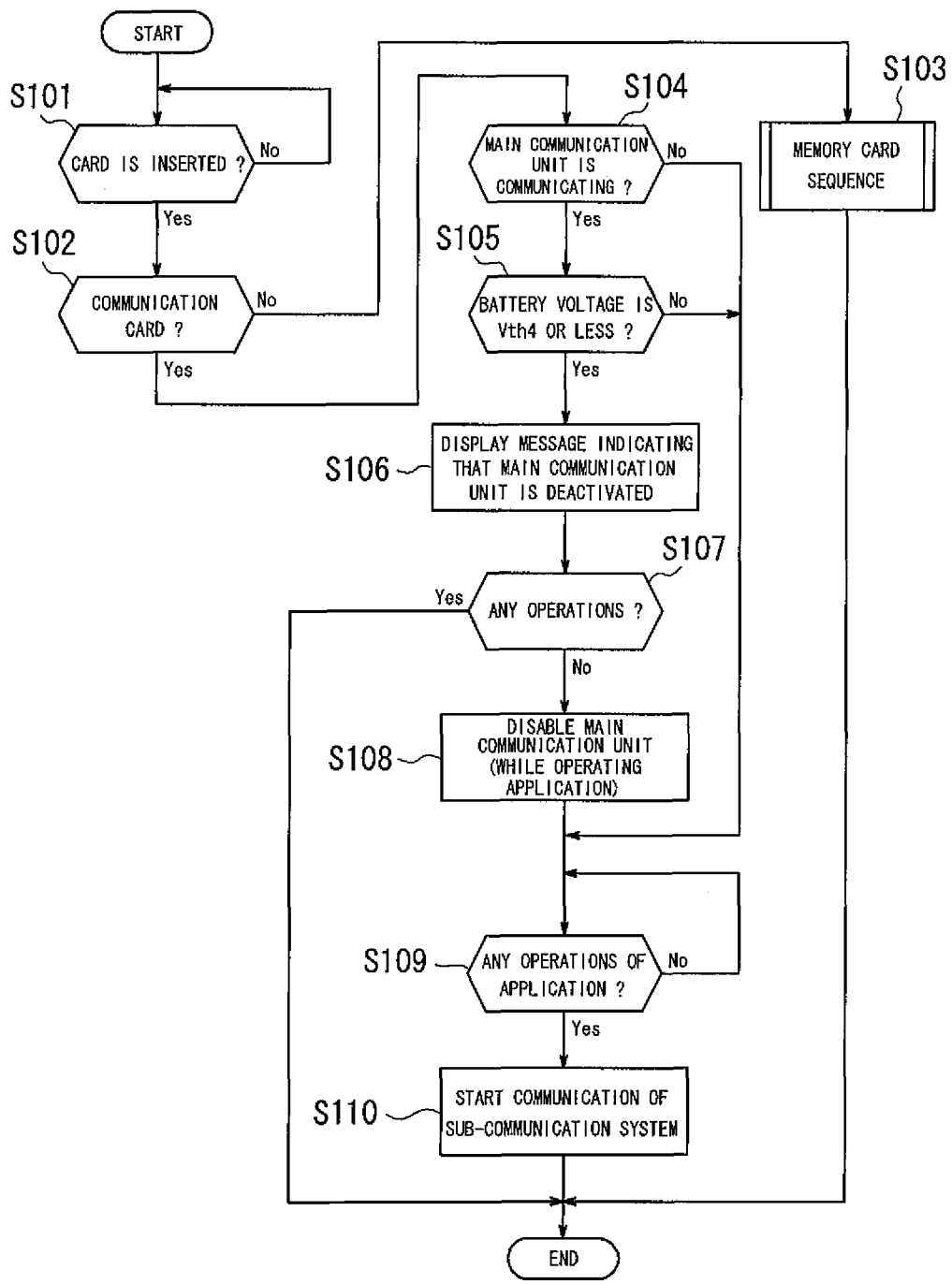
FIG. 3 is a flowchart showing an example of operation including detection of insertion of card into an SD I/F of the mobile communication terminal shown in FIG. 1.

FIG. 3 is a flowchart showing an example of operation including detection of insertion of card into the SD I/F 107. First, the external slot detection unit 108 monitors whether or not a card has been inserted into the SD I/F 107 (step S101). When the external slot detection unit 108 detects insertion of card, the control unit 111 determines whether or not the card is a communication card having a wireless function (step S102). Therefore, the control unit 111 also constitutes a determination unit for determining whether or not an external apparatus connected to the SD I/F 107 includes a sub-communication unit corresponding to a sub-system that consumes less power than the main system:

As a result of that, if the card is not a communication card, that is, if the card is a memory card, for example, the sequence corresponding to the memory card is operated (step S103). On the other hand, in the case of an SD wireless card 200, the control unit 111 checks a communication state to determine whether or not the main communication unit is during 1x communication (e.g. during browsing) (step S104).

Here, when the main communication unit is during 1x communication, then the control unit 111 determines whether or not the battery voltage which is measured by the battery voltage detection unit 104 is equal to or less than Vth4 (step S105). As a result of that, if the battery voltage is equal to or less than Vth4, the control unit 111 displays a message indicating that the communication by the main communication unit is discontinued on the display unit 106 (step S106). After that, if operation such as removal of the SD wireless card 200 is not performed (step S107), the control unit 111 disables the main communication unit (step S108) while operating the application of 1x communication (browsing). After that, the control 111 waits for an operation of the application (step S109), and when there is an operation requiring communication, starts wireless LAN communication by the sub-system. Thus the browsing that has been executed by 1x communication of the main system is continued by the wireless LAN of the sub-system (step S110).

In addition, when the control unit 111 determines that the main communication unit is not during 1x communication (during operation) at step S104, the process moves to step S109 and the application is executed by use of wireless LAN of the sub-system. Further, when it is determined that the battery voltage exceeds Vth4 at step S105, the process moves to step S109 and simultaneous communication performed independently by both systems is allowed. Moreover, the control unit 111 continues browsing by the main communication unit when operation to remove the SD wireless card 200 from the SD I/F 107 is performed at step S107 ("Yes" at step S107).

In this manner, when a sub-communication unit is added during communication (browsing) by a main communication unit, the mobile communication terminal 100 in accordance with the present embodiment disables the main communication unit that consumes greater power than the sub-communication unit without terminating the application with which the main communication unit has been communicated, when the battery voltage drops to equal to or less than Vth4. Thus the application with which the main communication unit has been communicated is taken over by the sub-communication unit that consumes less power than the main communication unit. Therefore, it is possible to prevent the mobile communication terminal 100 from being unusable abruptly due to simultaneous operations of both units, and thus unexpected circumstances will not occur to the user and operating time of the mobile communication terminal 100 can be extended as well. For example, when 1x communication and wireless LAN communication are simultaneously performed, the total current consumption of the wireless communication terminal 100 is about 700 mA as described above. Therefore, if the main communication unit is disabled, the current consumption can be reduced by over 70%.

In addition, in the same manner, when the SD wireless card 200 is inserted and uses the wireless LAN, communication of the sub-communication unit is started by performing process after step S104. Thus the mobile communication terminal 100 is prevented from being unusable and the same effect can be obtained.

Figure 4:
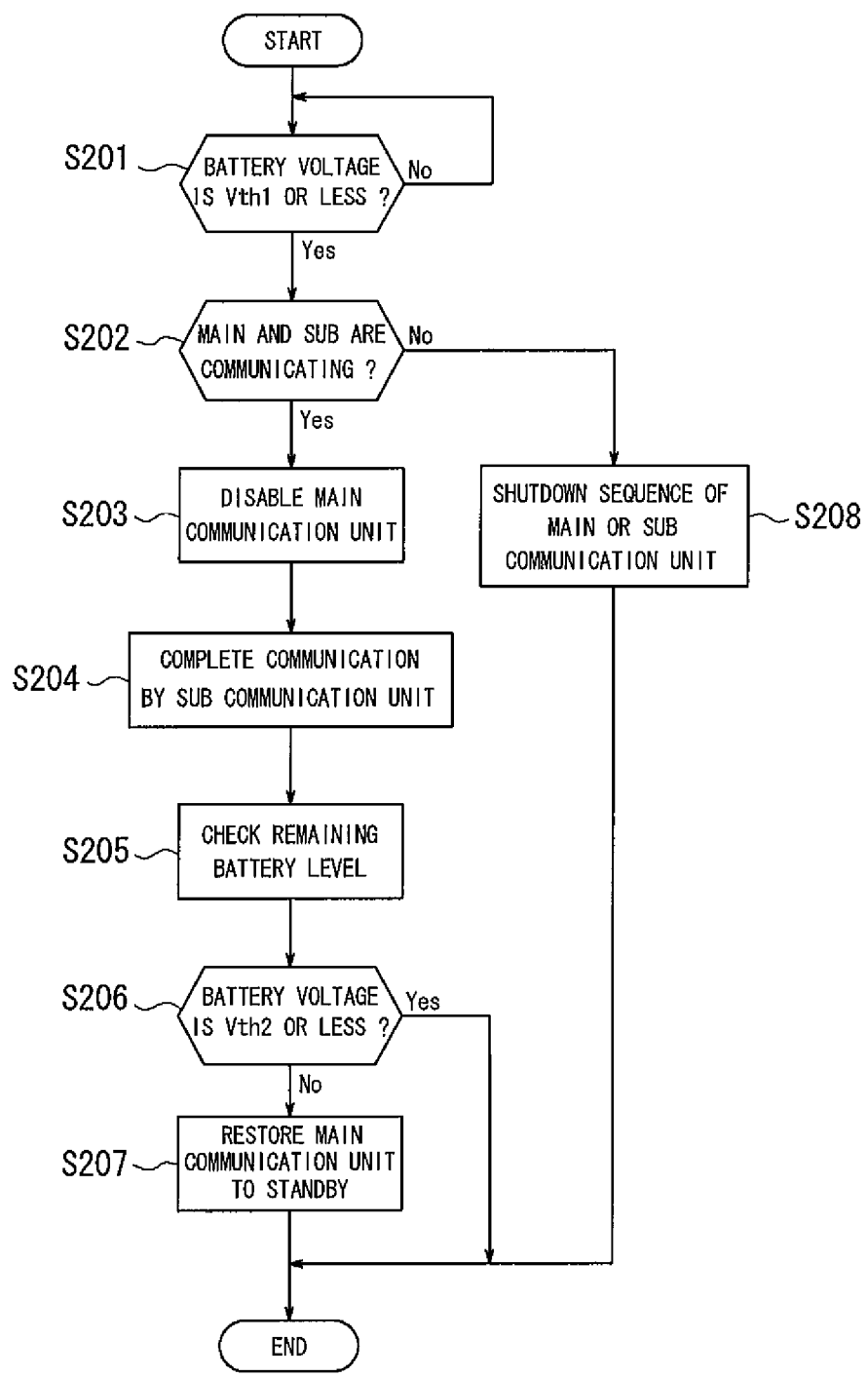
FIG. 4 is a flowchart of the mobile communication terminal in FIG. 1 showing an example of operation when 1x communication by the main communication unit and wireless LAN communication by the sub-communication unit are simultaneously performed.

FIG. 4 is a flowchart showing an example of operation when 1x communication by the main communication unit and wireless LAN communication by the sub-communication unit are simultaneously performed. First, the control unit 111 monitors whether or not the battery voltage measured at the battery voltage detection unit 104 is dropped to equal to or less than Vth1 (step S201), and when it has dropped to equal to or less than Vth1, checks the communication state to determine whether or not the main communication unit and the sub-communication unit are communicating (step S202). Here, when the main communication unit and the sub-communication unit are communicating ("Yes" at step S202), the control unit 111 displays a message indicating that the main communication unit should be disabled on the display unit 106 and discontinues the communication by the main communication unit, and then puts the communication unit into a state of out of service. Thus the main communication unit consuming a large amount of power is disabled, which is notified to the user (step S203).

After that, when wireless LAN communication (e.g. browsing) by the sub-communication unit is completed (step S204), the control unit 111 checks the remaining battery level (step S205) by the battery voltage detection unit 104. Here, since the main communication unit is disabled and the sub-communication unit is not communicating, the control unit 111 determines whether or not the battery voltage is equal to or less than Vth2 (step S206) on the assumption that the battery voltage is almost the same as that during standby. As a result of that, when it is not equal to or less than Vth2, the control unit 111 controls the main communication unit to automatically search a connectable base station to make the main communication unit in a standby state or has the user select whether or not to perform communication of the main communication unit (not shown). FIG. 4 shows the case where the main communication automatically searches a connectable base station to perform standby, thereby standby of the main communication unit is restarted, which is notified to the user (step S207). It should be noted that the control unit 111 does not allow the main communication unit to be restored to the standby state when the battery voltage is determined to be equal to or less than Vth2 at step S206. Further, in the above description, Vth2 is used as the battery voltage which is almost the same as that during standby, however, it is possible to set and store a new threshold and determine by use of the new threshold and battery voltage. In addition, it should be noted that at step S202, when either the main communication unit or the sub-communication unit is communicating ("No" at step S202), shutdown sequence of the communication unit during communication is executed (step S208).

Thereby when 1x communication of the main communication unit and wireless LAN communication of the sub-communication unit are simultaneously performed, there is no case where power supply unit 103 is turned off due to decline in the battery voltage and both communications are simultaneously abended. Thus browsing can be continued by the sub-communication unit that consumes less power when the battery voltage drops to equal to or less than Vth1. Therefore it is possible to make the best use of function as a communication apparatus and the operating time of mobile communication terminal 100 can be extended as well.

Figure 5:
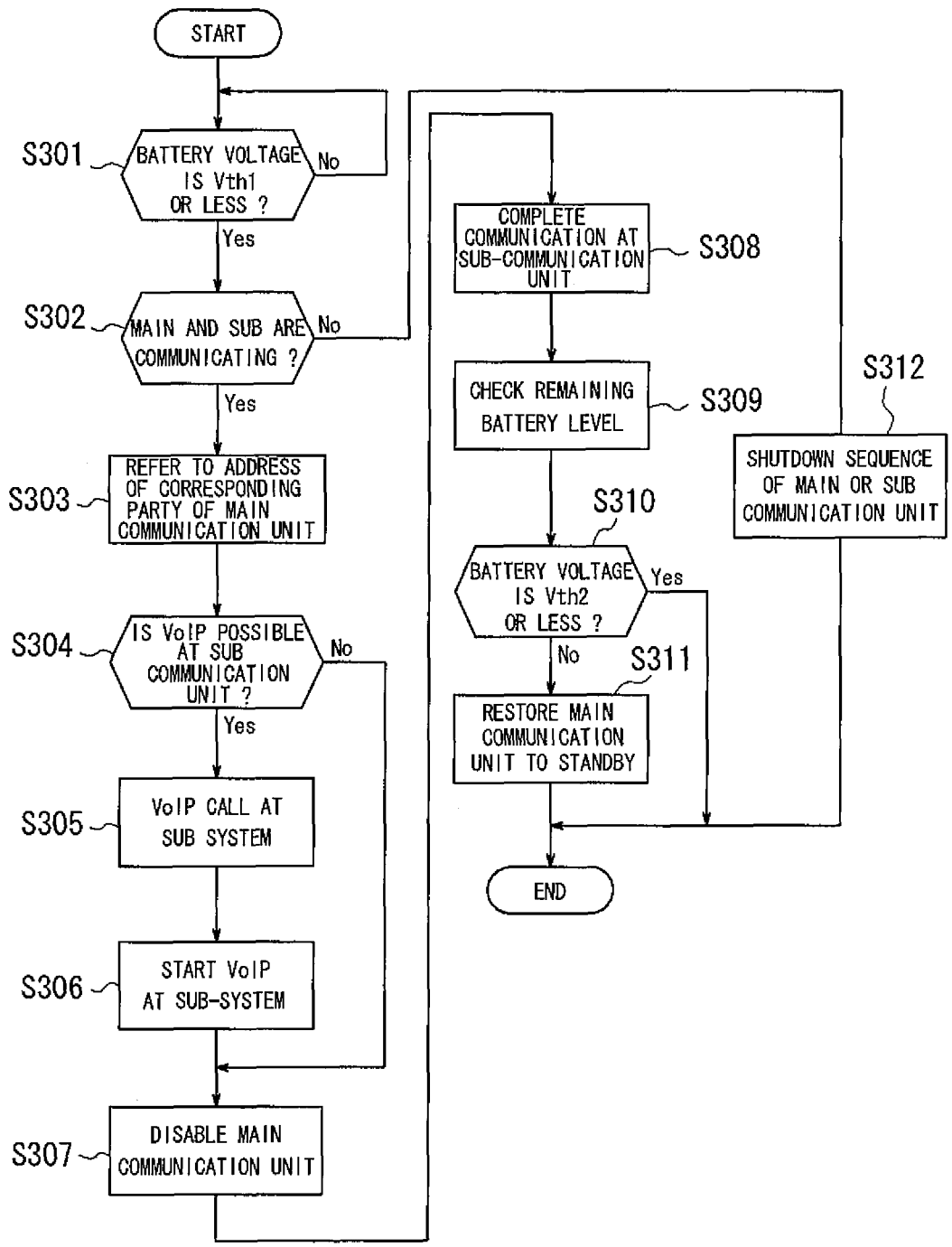
FIG. 5 is a flowchart showing an example of operation when communication of the main communication unit is realized by the sub-communication unit in FIG. 4.

FIG. 5 is a flowchart showing an example of operation where audio communication of the main communication unit is realized at the sub-communication unit that consumes less power when the battery voltage drops to equal to or less than Vth1 in the case where 1x communication (audio communication) by the main communication unit and wireless LAN communication (e.g. browsing) by the sub-communication unit are simultaneously performed as described in FIG. 4. First, the control unit 111 monitors whether or not the battery voltage measured at the battery voltage detection unit 104 has dropped to equal to or less than Vth1 (step S301), and when it has dropped to equal to or less than Vth1, checks the communication state to determine whether or not the main communication unit and the sub-communication unit are communicating (step S302).

Here, when the main communication unit and the sub-communication unit are communicating ("Yes" at step S302), the control unit 111 refers to the address of the terminal of the corresponding party performing audio communication by use of the main communication unit (step S303), and determines whether VoIP communication is possible or not by the sub-system (step S304). As a result of that, when VoIP communication is possible with the terminal of the corresponding party, the control unit 111 calls the corresponding party by the sub-system (step S305). After that, when the corresponding party responds, the control unit 111 starts VoIP communication at the sub-system (step S306), terminates the audio communication at the main communication unit, and puts the main communication unit into a state of out of service. Thereby the main communication unit that consumes a large amount of power is disabled, which is notified to the user (step S307). In addition, the control unit 111 executes step S307 in the same manner when it is determined that VoIP communication is not possible at the sub-communication unit at step S304 or the corresponding party does not respond to VoIP during a certain period of time at step S306.

After that, when wireless LAN communication (e.g. VoIP or browsing) by the sub-communication unit is completed (step S308), the control unit 111 checks the remaining battery level (step S309) by the battery voltage detection unit 104. Here, since the main communication unit is disabled and the sub-communication unit is not communicating, the control unit 111 determines whether or not the battery voltage is equal to or less than Vth2 (step S310) on the assumption that the battery voltage is almost the same as that during standby. As a result of that, when it is not equal to or less than Vth2, the control unit 111 controls the main communication unit to automatically search a connectable base station to make the main communication unit in a standby state or has the user select whether or not to perform communication of the main communication unit (not shown). As in the case of FIG. 4, FIG. 5 shows the case where the main communication unit automatically searches a connectable base station to perform standby and thereby standby at the main communication unit is restarted, which is notified to the user (step S311). It should be noted that the control unit 111 does not allow the main communication unit to be restored to the standby state when the battery voltage is determined to be equal to or less than Vth2 at step S310. Further, in the above description, Vth2 is used as the battery voltage which is almost the same as that during standby, however, it is possible to set and store a new threshold and determine by use of the new threshold and battery voltage. In addition, it should be noted that at step S302, when either the main communication unit or the sub-communication unit is communicating ("No" at step S302), shutdown sequence of the communication unit during communication is executed (step S312).

Thereby when audio communication by the main communication unit and browsing by the sub-communication unit are simultaneously performed, there is no case where the power supply unit 103 is turned of due to decline in the battery voltage and both communications are not simultaneously abended. Thus audio communication of the main communication unit can be continued at the sub-communication unit that consumes less power when the battery voltage drops to equal to or less than Vth1. Therefore it is possible to make the best use of function as a phone.

Figure 6:
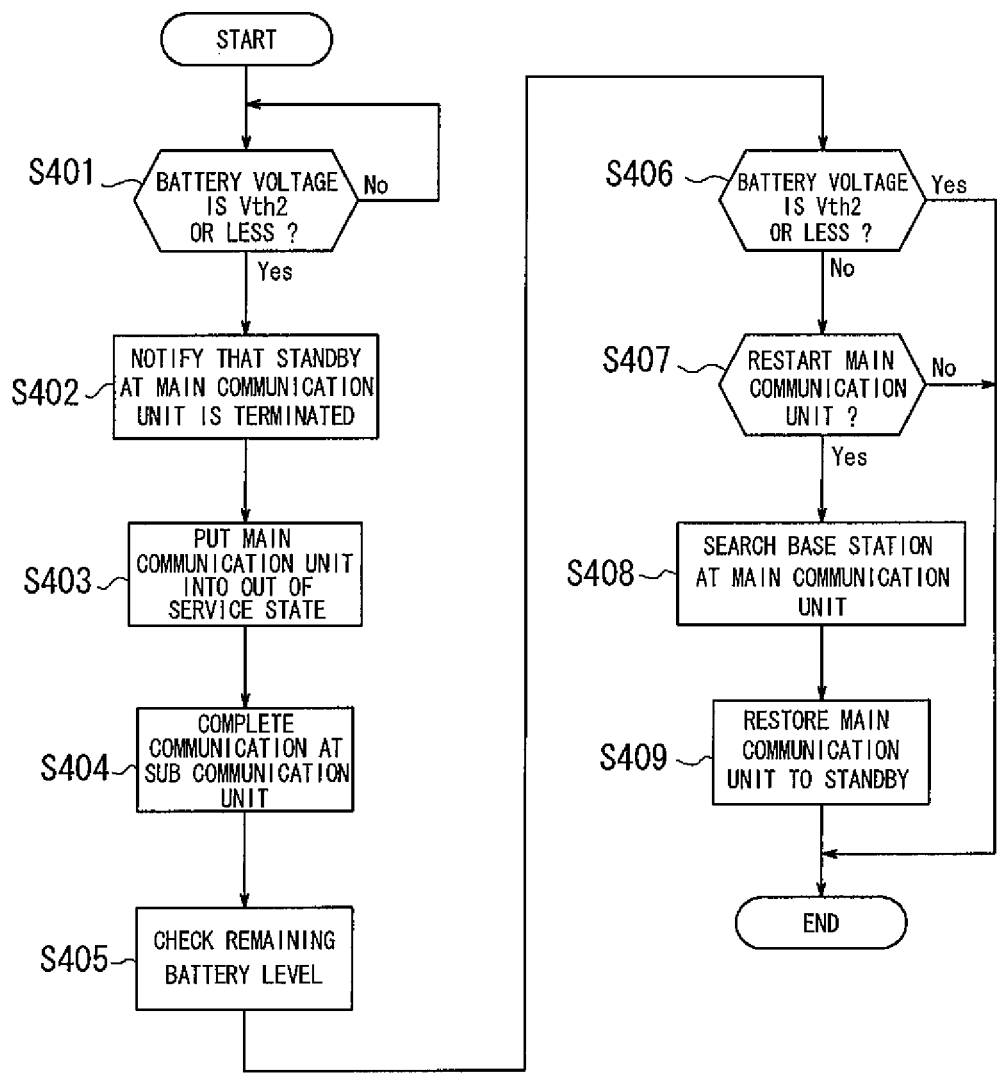
FIG. 6 is a flowchart of the mobile communication terminal in FIG. 1 showing an example of operation when the remaining battery level drops to equal to or less than Vth2 while browsing at the sub-communication.

FIG. 6 is a flowchart showing an example of operation in the case where the remaining battery level drops to equal to or less than Vth2 when wireless LAN communication (e.g. browsing) is performed by use of the sub-communication unit. First, the control unit 111 notifies the user of termination of standby at the main communication unit by use of the display unit 106 and the like (step S402) when the battery voltage measured at the battery voltage detection unit 104 becomes Vth2 (step S401). Further, the control unit 111 terminates power supply to a transmission unit (not shown) of the wireless unit 102 in order not to send back a message such as Ack or the like to the base station even if call is received, which is a state of out of service, and prohibits transmission at the main communication unit, and thus the main communication unit is disabled (step S403).

After that, when browsing at the sub-communication unit is completed (step S404), the control unit 111 checks the remaining battery level (step S405) by the battery voltage detection unit 104. Here, since the main communication unit is disabled and the sub-communication unit is not communicating, the control unit 111 determines whether or not the battery voltage is equal to or less than Vth2 (step S406) on the assumption that the battery voltage is almost the same as that during standby. As a result of that, when it is not equal to or less than Vth2, the control unit 111 has the user select whether or not to restart standby of the main communication unit (step S407). When the user selects restart of standby, the control unit 111 controls the main communication unit to automatically search a connectable base station (step S408), and thereby the main communication unit is restored to the standby state (step S409). It should be noted that when it is determined that the battery voltage is equal to or less than Vth2 at step S406 or restart of standby is not selected at step S407, the control unit 111 does not allow the main communication unit to be restored to the standby state. In addition, it should be noted that when the battery voltage is determined to be over Vth2, the control unit 111 may automatically restart standby of the main communication unit (not shown). Further, in the above description, although Vth2 is used as the battery voltage which is almost the same as that during standby, it is possible to set and store a new threshold and determine by use of the new threshold and battery voltage.

According to the above example of operation, for example, when the battery voltage drops to equal to or less than Vth2 during browsing at the sub-communication unit, the main communication unit is disabled, which prevents the wireless communication terminal 100 from becoming unusable because the power supply unit 103 is turned off due to start of idle handover (switching of base station) or processing accompanied with transmission such as response to incoming call and the like at the main communication in a standby state. Thus browsing at the sub-communication unit that consumes less power can normally be terminated.

Figure 7:
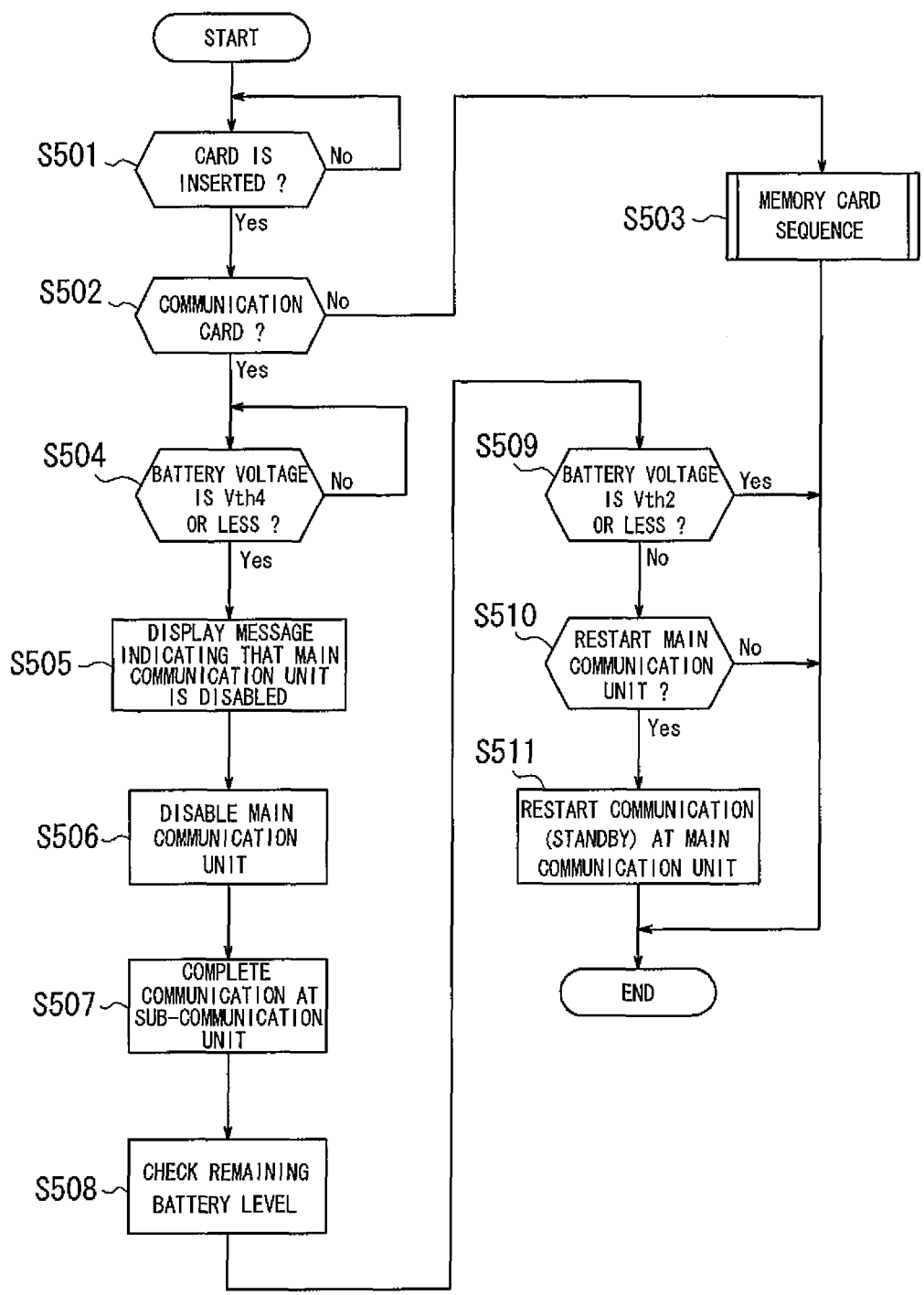
FIG. 7 is a flowchart of the mobile communication terminal in FIG. 1 showing an example of operation when data reception of BCMCS by the main communication unit and wireless LAN communication by the sub-communication unit are simultaneously performed.

FIG. 7 is a flowchart showing an example of operation when data reception of BCMCS by the main communication unit and wireless LAN communication (e.g. browsing) by the sub-communication unit are simultaneously performed. First, the external slot detection unit 108 monitors whether or not a card is inserted into the SD I/F 107 (step S501) during data reception of BCMCS. When the external slot detection unit 108 detects insertion of card, the control unit 111 determines whether or not the card is a communication card having a wireless function (step S502). As a result of that, when the card is not a communication card, but a memory card, for example, the control unit 111 operates the sequence corresponding to the memory card (step S503). On the other hand, when the card is an SD wireless card 200, the control unit 111 monitors whether or not the battery voltage which is measured at the battery voltage detection unit 104 has dropped to equal to or less than Vth4 (step S504). As a result of that, when the voltage is equal to or less than Vth4, the control unit 111 displays a message indicating that the main communication unit should be disabled on the display unit 106 (step S505), discontinues communication by the main communication unit, and disables the main communication unit (step S506).

After that, when browsing at the sub-communication unit is completed (step S507), the control unit 111 checks the remaining battery level by the battery voltage detection unit 104 (step S508). Here, since the main communication unit is disabled and the sub-communication unit is not communicating, the control unit 111 determines whether or not the battery voltage is equal to or less than Vth2 (step S509) on the assumption that the battery voltage is almost the same as that during standby. As a result of that, when it is not equal to or less than Vth2, the control unit 111 has the user select whether or not to restart communication by the main communication unit (step S510). When the user selects to restart communication, the control unit 111 restarts communication (standby) of the main communication unit (step S511). It should be noted that when it is determined that the battery voltage is equal to or less than Vth2 at step S509 or restart of communication of the main communication unit is not selected at step S510, the control unit 111 leaves the main communication unit disabled. When it is determined that the battery voltage is above Vth2, the standby of the main communication unit may be restarted automatically (not shown). Further, in the above description, although Vth2 is used as the battery voltage which is almost the same as that during standby, it is possible to set and store a new threshold and determine by use of the new threshold and battery voltage.

Thereby when data reception of BCMCS by the main communication unit and browsing by the sub-communication unit are simultaneously performed, there is no case where the power supply unit 103 is turned off due to decline in the battery voltage and both communications are not simultaneously abended. Thus only browsing at the sub-communication unit that consumes less power can be continued when the battery voltage drops to equal to or less than Vth4.

As described above, in the present embodiment, when a sub-communication unit that consumes less power than a main communication unit is added, priority is given to the communication by the sub-communication unit depending on the battery voltage. Thus abend of the main communication unit and the sub-communication unit due to decline in battery voltage can be prevented, which enables extension of standby time of the mobile communication terminal 100. In addition, when communication by the main communication unit is discontinued, the discontinuation is displayed on the display unit 106, so that user convenience can be improved.

Second Embodiment

In the mobile communication terminal capable of adding a sub-system as described above, it is desirable that the user be able to recognize whether an application using a main system can be used. Consequently, the second embodiment of the present invention is designed so that a user can easily recognize a usable application when a sub-system is added.

Figure 8:
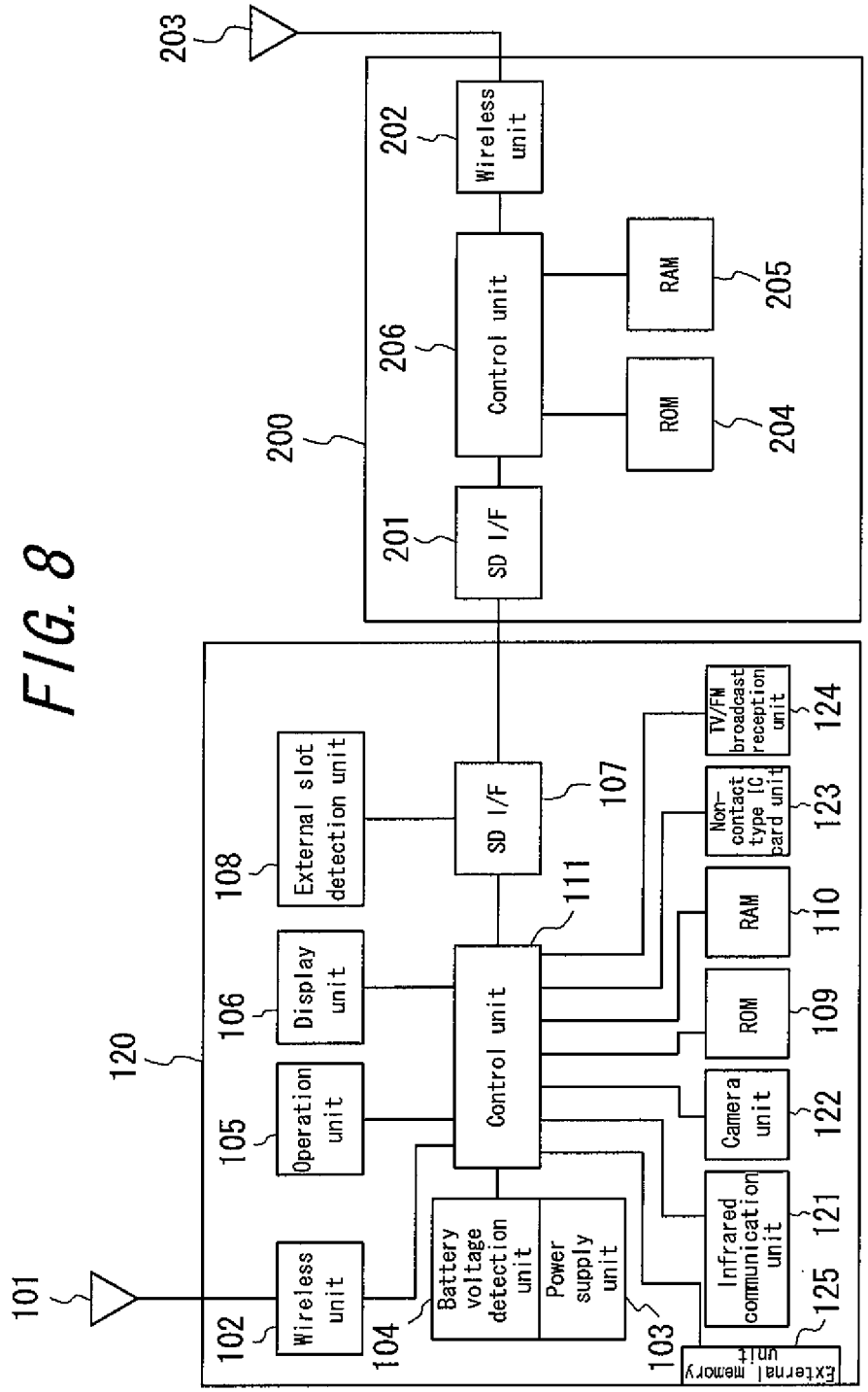
FIG. 8 is a functional block diagram showing a configuration of main units of a mobile communication terminal in accordance with a second embodiment of the present invention.

FIG. 8 is a functional block diagram showing a configuration of main units of a mobile communication terminal in accordance with a second embodiment of the present invention. The mobile communication terminal 120 has a configuration in which various known function units are added to the configuration of mobile communication terminal 100 shown in FIG. 1 based on the specification. Therefore, the identical reference numerals are given to the components constituting the same function as those shown in FIG. 1, and explanations thereof are omitted. As an example of added function units, FIG. 8 shows the case where an infrared communication unit 121, a camera unit 122, a non-contact type IC card unit 123, a TV/FM broadcast reception unit 124, and an external memory unit 125 which an external memory such as a micro SD and the like can be inserted to and removed from are incorporated. Driving of these function units are controlled by the control unit 111 based on respective applications corresponding to these units. Further, based on the specification, the mobile communication terminal 100 has various known functions such as a music play function, a messenger function, a game function and the like, and various applications can be executed by the control unit 111.

The mobile communication terminal 120 in accordance with the present embodiment operates in the same manner as the mobile communication terminal 100 in accordance with the first embodiment when the SD wireless card 200 is inserted into the SD I/F 107. However, in the present embodiment, a display screen showing activation of application, that is, a menu screen, displayed on the display unit 106 by the control unit 111 is changed. A display example of the menu screen will be described below.

Figure 9:
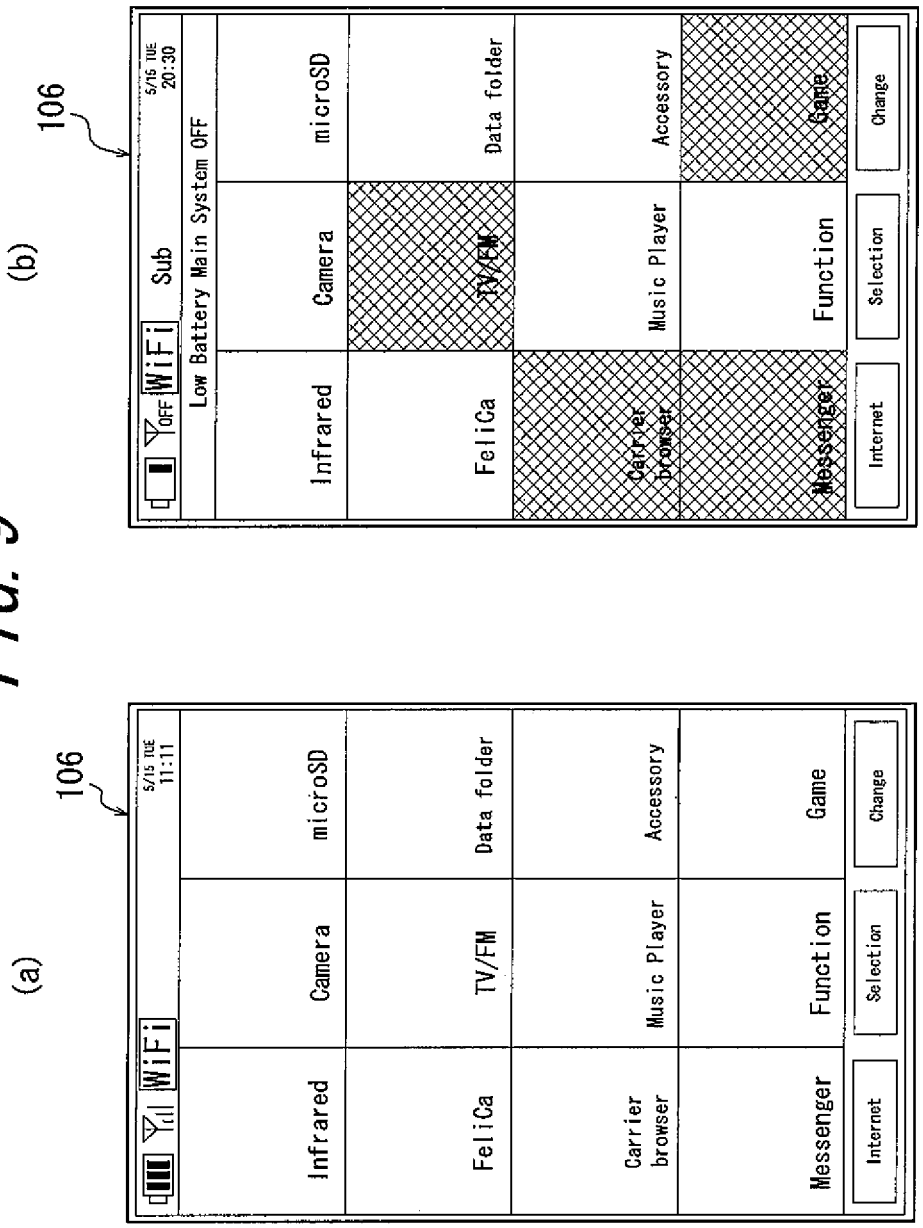
FIG. 9 shows a first display example of a menu screen of the mobile communication terminal shown in FIG. 8.

FIG. 9 is a first display example of the menu screen. FIG. 9(a) shows a menu screen when a main communication unit and a sub-communication unit are operating. FIG. 9(b) shows a menu screen when only the sub-communication unit is operating while the main communication unit is disabled.

All applications of the mobile communication terminal 120 are usable when battery voltage is enough and the main communication unit and the sub-communication unit are operating. Therefore, in this case, the control unit 111 controls the display unit 106 to display activation of various applications on the menu screen in a selectable manner, as shown in FIG. 9(*a*). When an activation display of an application is selected in accordance with the display in a soft key area of the display unit 106, the control unit 111 controls the application to be executed. In addition, since the main communication unit is being used, receiving sensitivity thereof is displayed in a pictogram area of the display unit 106.

Further, on the menu screen of FIG. 9(*a*), as activation displays of applications, "infrared" for executing an infrared communication function of the infrared communication unit 121, "camera" for executing a camera function of the camera unit 122, "FeliCa" for executing a communication function of the non-contact type IC card unit 123, "TV/FM" for executing a broadcast reception function of the TV/FM broadcast reception unit 124, "micro SD" for executing a function of the external memory unit 125, "data folder" for executing a data folder function, "carrier browser" for executing browser exclusive to a mobile phone carrier, "Music Player" for executing a music play function, "accessory" for executing an accessory function, "Messenger" for executing a messenger function, "Game" for executing a game function and "functions" for executing functions such as other various settings are respectively displayed on the predetermined position.

On the other hand, as described above, when the main communication unit is disabled (OFF), the communication network of mobile phone carrier for the main communication unit can no longer be used. Thus, application such as "carrier browser", "Game" and the like that requires authentication by use of the main communication unit can no longer be used. In addition, since IP address provided by the mobile phone carrier can no longer be used, the "Messenger" application can also no longer be used.

Therefore, when only the sub-communication unit is operating while the main communication unit is disabled, the control unit 111 controls the display unit 106 to change the menu screen to indicate that the main communication unit cannot be used. For example, as shown in FIG. 9(*b*), the activation display of application that cannot be used unless the main communication unit is used is changed to a display indicating "not selectable". In FIG. 9(*b*), the display indicating "not selectable" is shown by shading. Thus the control unit 111 controls so that even if an application shown as "not selectable" is selected, the application is not executed. Further, in FIG. 9(*b*), in the case of 1 seg broadcasting, for example, since "TV/FM" application may be accompanied with communication by the main communication unit, the activation display of such application accompanied with the use of the main communication unit is also changed to the display indicating "not selectable". Further, the display may be modified to a display that does not allow selection of the shaded areas.

Moreover, a message indicating that the main communication unit cannot be used because the battery voltage is equal to or less than a threshold is displayed in the menu display area to visually notify the user of it. FIG. 9(*b*) shows the case where "Low Battery Main System OFF" is displayed to notify that the main communication unit cannot be used. Further, in FIG. 9(*b*), in addition to the message indicating that the main communication unit cannot be used, "Sub" is displayed in the pictogram area to visually notify the user that only the sub-communication unit is operating. Thus the user can easily recognize the operating state of the mobile communication terminal 120 and the application that can be used. Therefore, in the mobile communication terminal 120 shown in FIG. 8, the control unit 111 and the display unit 106 constitute a display change unit.

Figure 10:
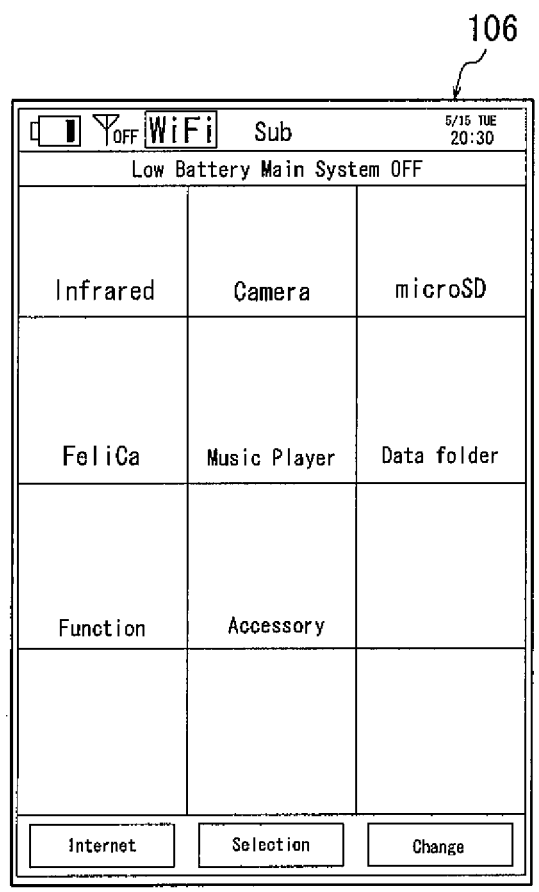
FIG. 10 shows a second display example of the menu screen of the mobile communication terminal shown in FIG. 8.

FIG. 10 is a second display example of the menu screen, which shows the case where the main communication unit is disabled and only the sub-communication unit is operating. In this display example, activation displays of the applications of "carrier browser", "Game", "Messenger" and "TV/FM" that cannot be used unless the main communication unit is used are not displayed, and only activation displays of usable applications are displayed in a selectable manner without leaving space between icons. Therefore, compared to FIG. 9(*b*), it has the advantage that a user can recognize usable applications more easily. In addition, the menu screen during operation of the main communication unit and the sub-communication unit is displayed as in the case of FIG. 9(*a*).

Figure 11:
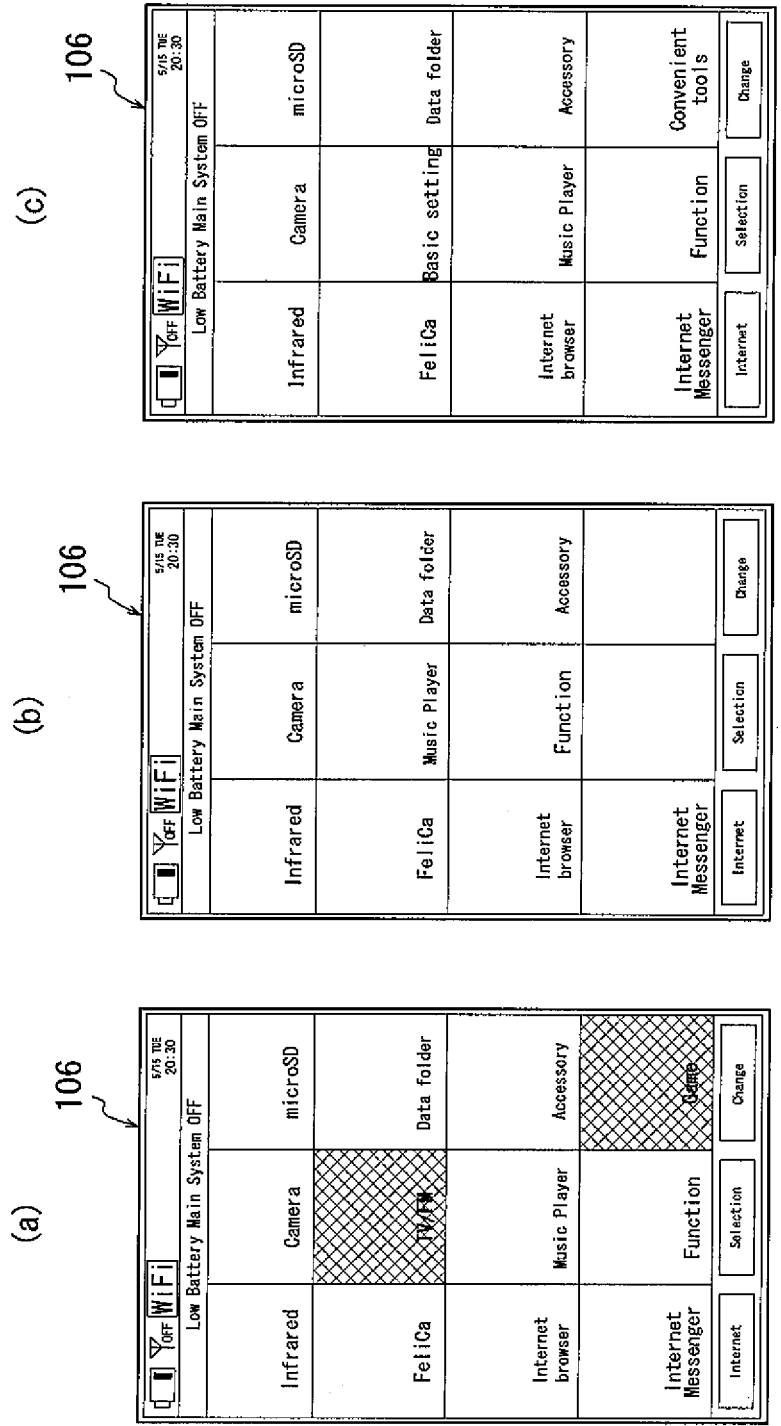
FIG. 11 shows a third display example of the menu screen of the mobile communication terminal shown in FIG. 8.

FIGS. 11(*a*) to (*c*) show a third display example of menu screen, which shows three display manners of menu screen in the case where the main communication unit is disabled and only the sub-communication unit is operating. In these display examples, the menu screen is changed so that the activation display of an application that cannot be used due to disabled main communication unit is replaced by an activation display of an application which has similar functions and can be executed by the sub-communication unit, and the latter is displayed in a selectable manner. Here, the activation displays of the applications such as "carrier browser" and "Messenger" by the main communication unit are respectively replaced by the activation displays of applications such as "Internet browser" and "Internet Messenger", which are functions of the sub-communication unit similar to those of the main communication unit.

In FIG. 11(*a*), the activation displays of executable applications including "Internet browser" and "Internet Messenger" which have the similar functions and replace applications of the main communication unit are displayed in a selectable manner, and the activation displays of applications such as "TV/FM" and "Game" that cannot be replaced are displayed by being changed to the display indicating "not selectable" in the same manner as FIG. 9(*b*). In addition, as in the case of FIG. 10, FIG. 11(*b*) does not display the activation displays of applications such as unusable "TV/FM" and "Game", and displays the activation displays of only usable applications in a selectable manner without leaving space between icons. Further, in FIG. 11(*c*), instead of the activation displays of unusable applications such as "TV/FM" and "Game", activation displays of frequently operated applications such as "Basic setting" and "Convenient tools" are displayed. It should be noted that a menu screen in the case where the main communication unit and the sub-communication unit are operating is displayed in the same manner as FIG. 9(*a*).

In this manner, when a menu screen is changed so that the activation displays of the applications that cannot be used due to disabled main communication unit are replaced by the activation displays of applications which have the similar functions and can be executed by the sub-communication unit, and the latter is displayed in a selectable manner, particularly, as described with reference to FIGS. 3 and 5, the user can easily select an activation display of an application having the similar functions when an application with which the main communication unit has communicated is taken over by the sub-communication unit that consumes less power. Thus user convenience can be improved.

According to the mobile communication terminal 120 of the present embodiment, when the main communication unit is disabled, the display of menu screen on the display unit 106 is changed to indicate that the main communication unit cannot be used. Therefore, in addition to the effect of the first embodiment, the user can easily recognize the usable applications, and thus user convenience can be improved.

Third Embodiment

As described above, in a mobile communication terminal capable of adding a sub-system, when power supply of the mobile communication terminal itself is abruptly turned off not by user operation while communication is performed only by the sub-system, it is considered that the communication is continued while charging the battery by connecting a charger to the terminal. In this case, power may be supplied only to the sub-communication unit of sub-system, and not to the main communication unit of main system to perform communication. In this case, power of the terminal itself is turned on, but as for the power of the main communication unit, it may be turned on by the user operation or automatically turned on when charge is started.

However, as the former, in a case where the power supply of the main communication unit is turned on by the user operation, when the user forgets turning on the power supply, if call and the like is received by the main system, it is not possible to respond to the call. In addition, some users may want to start communication by immediately turning on the power supply of the main communication unit when a charger is connected to and starts charging the terminal. In this case, when the power supply button of the main communication unit is shared by that of the terminal, it is not possible to determine whether the user wants to turn off the power supply of the terminal itself or turn on the power supply of the main communication unit.

On the other hand, as the latter, when power supply of the main communication unit and the sub-communication unit is automatically turned on by starting charge, almost all of the power which are supplied from the charger is consumed by the main communication unit and the sub-communication unit. Therefore, battery charge needs a lot of time. Therefore, if the user pulls out the charger for some reason, power supply of the terminal is immediately turned off again.

In this manner, in a mobile communication terminal capable of adding a sub-communication unit, if battery charge is started when power supply of the terminal itself is turned off due to the battery voltage, there is concern that unexpected circumstances may occur to the user, such as the restoration operation of the main communication unit is forgotten and response to incoming calls and the like cannot be done or even if the main communication unit is restored, power supply of the terminal itself is turned off when charge is interrupted.

Thus, in the third embodiment of the present invention, when battery charge is started due to disabled main communication unit, the main communication unit can appropriately be restored without causing unexpected circumstances to the user, thus the user convenience can be improved.

Figure 12:
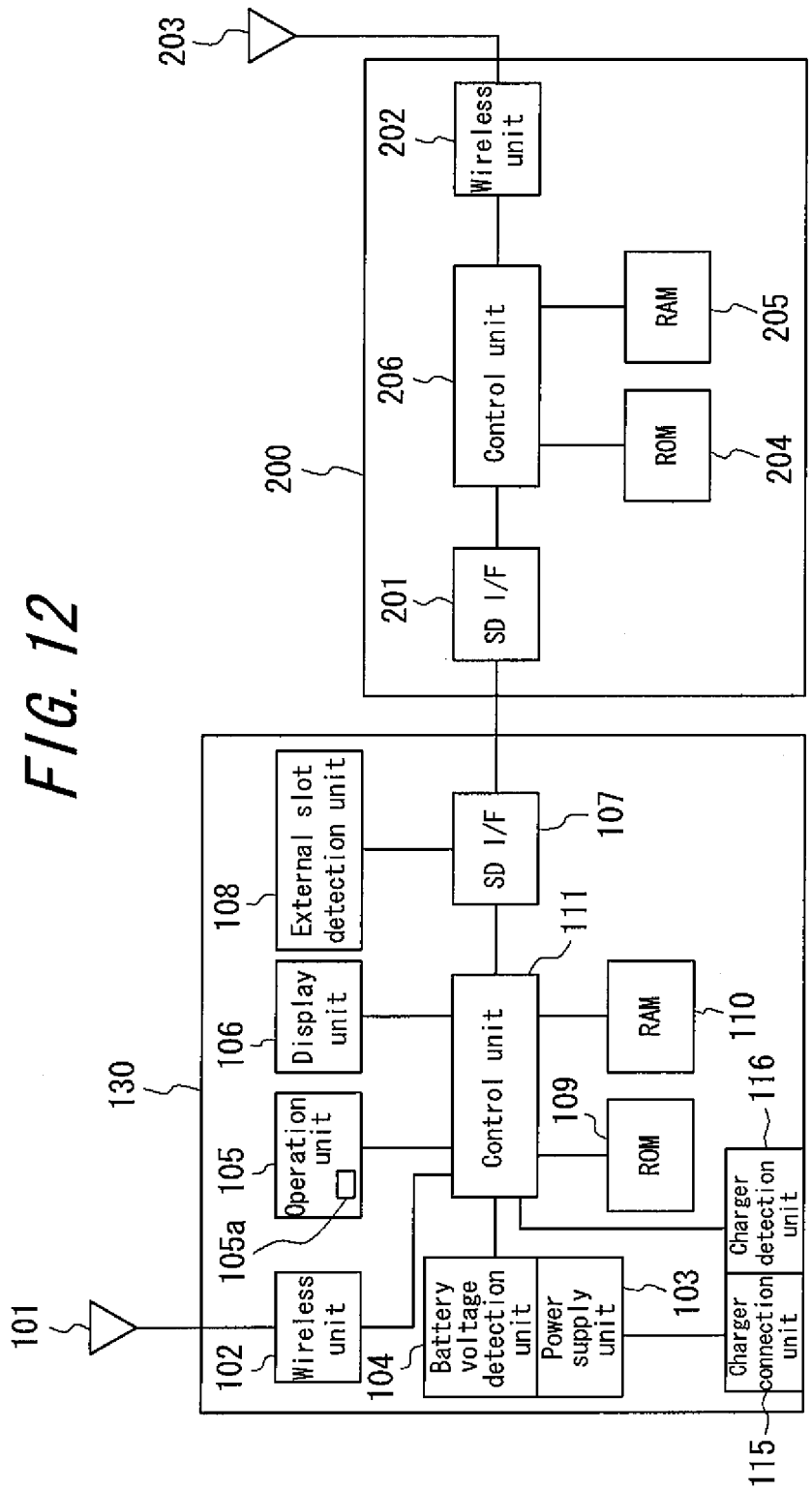
FIG. 12 is a functional block diagram showing a configuration of main units of a mobile communication terminal in accordance with a third embodiment of the present invention.

FIG. 12 is a functional block diagram showing a configuration of main units of a mobile communication terminal in accordance with the third embodiment of the present invention. The mobile communication terminal 130 is designed by providing the mobile communication terminal 100 shown in FIG. 1 with a power supply button 105a, which is a power supply operation unit and included in the operation unit 105, a charger connection unit 115 to which a charger (not shown) such as an AC adapter for charging the battery of the power supply unit 103 is detachably connected and a charger detection unit 116 for detecting battery charge by a charger via a charger connection unit 115. Therefore, the identical reference numerals are given to the components constituting the same functions as those shown in FIG. 1, and explanations thereof are omitted.

The mobile communication terminal 130 in accordance with the present embodiment operates in the same manner as the mobile communication terminal 100 in accordance with the first embodiment when an SD wireless card 200 is inserted in the SD I/F 107. However, in the present embodiment, when battery charge is started due to disabled main communication unit, the control unit 111 further controls the restoration operation of the main communication unit.

The restoration operation of the main communication unit in the case where the SD wireless card 200 is inserted and the main communication unit is turned off is described below with reference to the flowchart shown in FIG. 13 and the example of display screen shown in FIG. 14.

First, based on the output from the charger detection unit 116, the control unit 111 detects whether or not a charger is connected to the charger connection unit 115 and starts charging the battery, that is, the battery is being charged or not (step S601). Then when charge is started, the control unit 111 detects whether or not the power supply button 105a of the operation unit 105 is operated (step S602). As a result of that, if the power supply button 105a is not operated, the control unit 111 waits for the battery voltage detected by the battery voltage detection unit 104 to exceed a predetermined value (in this case, Vth2) (step S603) and supplies power to the main communication unit to turn on the main communication unit (step S604).

On the contrary, when operation of the power supply button 105a is detected at step S602, the control unit 111 displays a message (step S605) inquiring that main communication unit ON or terminal power supply OFF as shown in FIG. 14(a) to ask the user to select either one of them (step S606). It should be noted that since the main communication unit is OFF and only the sub-communication unit is operating in this state, in the present embodiment, "Low Battery Main System OFF" is displayed on the display unit 106 as shown in FIG. 14(a) and "OFF" is displayed near the antenna mark in the pictogram area as well to visually notify the user that the main communication unit cannot be used. Further, "Sub" is displayed in the pictogram area to visually notify the user that only the sub-communication unit is operating.

When terminal power supply OFF is selected at step S606, the control unit 111 turns off the power supply of the terminal (step S607) and continues charge. On the other hand, when main communication unit ON is selected, the control unit 111 supplies power to the main communication unit to turn on the main communication unit (step S608) and displays a message as shown in FIG. 14(b) on the display unit 106 to notify the user that the main communication unit is turned off when the charger is pulled out (step S609). In addition, in the case of FIG. 14(b), the battery voltage has not yet reached the predetermined value (Vth2) even if the main communication unit is turned on, and therefore, as in the case of FIG. 14(a), in addition to the above mentioned message, a message indicating that the main communication unit cannot be used and only the sub-communication unit is operating is displayed.

After that, when the control unit 111 detects that the battery voltage detected by the battery voltage detection unit 104 has exceeded the predetermined value (Vth2) (step S610), the control unit 111 changes the message displayed on the display unit 106 to the contents as shown in FIG. 14(c) to notify the user that the main communication unit can be used even if the charger is pulled out (step S611). It should be noted that in FIG. 14(c), a reception state is displayed near the antenna mark in the pictogram area and the displays of "Sub" and "Low Battery Main System OFF" are eliminated, and thus the state where the main communication unit is turned on and can be used is shown.

As described above, in the mobile communication terminal 130 in accordance with the present embodiment, in the case where the power supply button 105a is not operated when charge is started under the condition where the sub-communication unit is turned on and the main communication unit is turned off due to low battery voltage, the main communication unit is not turned on immediately, but is automatically turned on after the battery voltage is recovered to the level that is enough for both the main communication unit and the sub-communication unit to keep communication. Thus it is possible to ensure response to incoming calls and the like at the main system and after the main communication unit is automatically turned on, it is possible to communicate at both communication units even if the user pulls out the charger for some reason.

In addition, when the power supply button 105a is pushed after charge is started, the control unit 111 controls so that the selection screen as shown in FIG. 14(a) is displayed on the display unit 106 to ask the user to select either main communication unit ON or terminal power supply OFF. Then, when the main communication unit ON is selected, the control unit 111 controls so that the message shown in FIG. 14(b) is displayed on the display unit 106 until the battery voltage exceeds the predetermined value (Vth2) to call the user's attention not to pull out the charger, and then when the battery voltage exceeds the predetermined value (Vth2), the message shown in FIG. 14(c) is displayed on the display unit 106 to notify the user that communication can be performed even if the charger is pulled out. Therefore, it is possible to prevent the main communication unit from being disabled again due to abrupt pulling out of the charger. Thereby the main communication unit can appropriately be restored without causing unexpected circumstance to the user, and user convenience can be improved.

Figure 13:
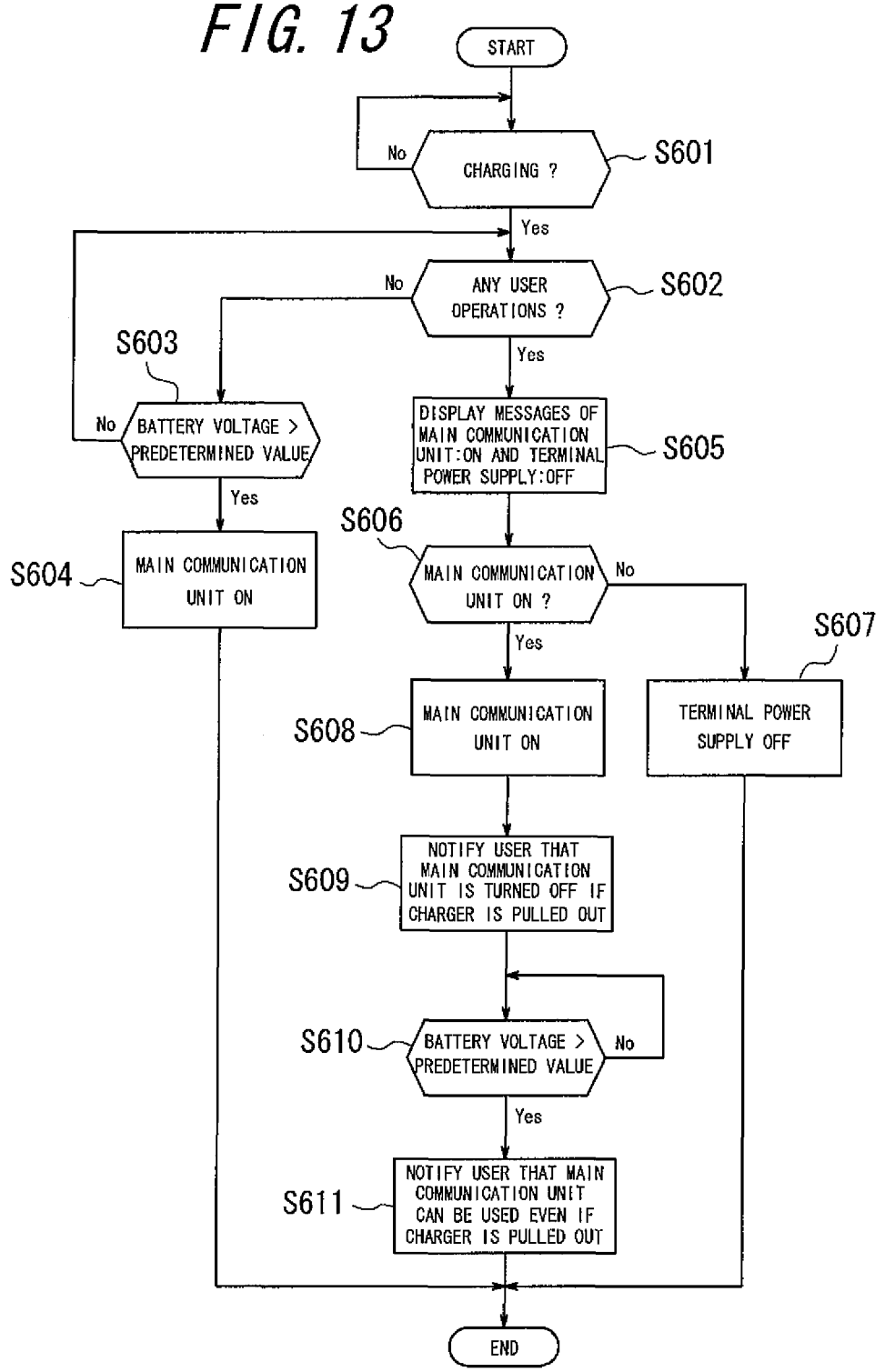
FIG. 13 is a flowchart illustrating an example of restoration operation of the main communication unit of the mobile communication terminal shown in FIG. 12.
Figure 14:
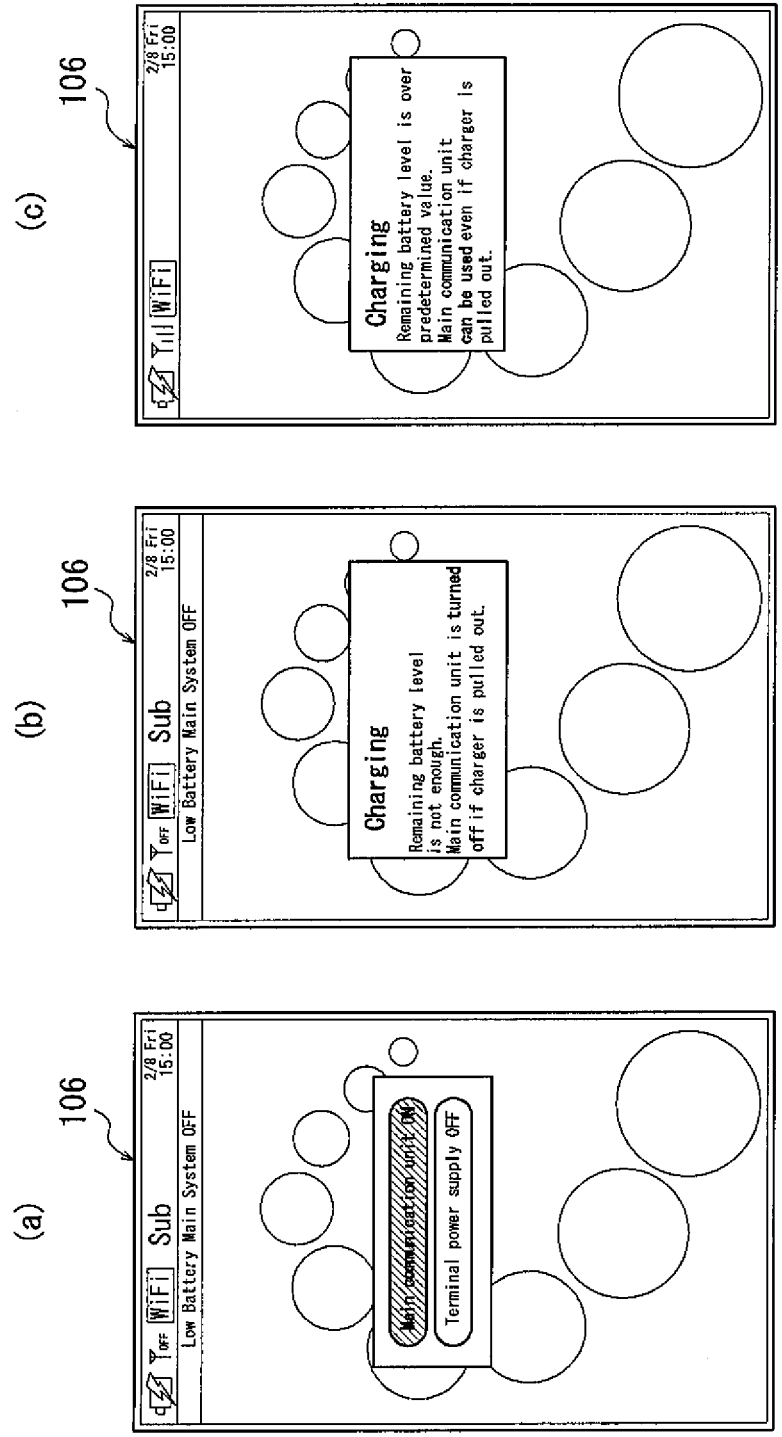
FIG. 14 shows an example of a screen display accompanied with the restoration operation of the main communication unit shown in FIG. 13.

With respect to the restoration operation of the main communication unit shown in FIG. 13, instead of the screen displays shown in FIGS. 14(a) to (c), or together with these screen displays, the same notifications may be performed to the user by use of audio or vibration functions.

Fourth Embodiment

In each embodiment described above, when a sub-communication unit that consumes less power than a main communication unit is added, priority is given to the communication at the sub-communication unit depending on the battery voltage. Therefore, when communication is performed by giving propriety only to the sub-communication unit, displaying the battery mark based on the remaining battery level is effective for the user to recognize the state of availability of the sub-communication unit and to prevent unexpected circumstances such as abrupt turning off of power supply due to low remaining battery level in the case where the sub-communication unit is used.

Consequently, in the fourth embodiment of the present invention, when the main communication unit is disabled by the control unit 111 in the mobile communication terminal shown in each embodiment described above, the battery mark indicating the remaining battery level is changed from the battery mark based on the main communication unit to that based on the sub-communication unit.

Figure 15:
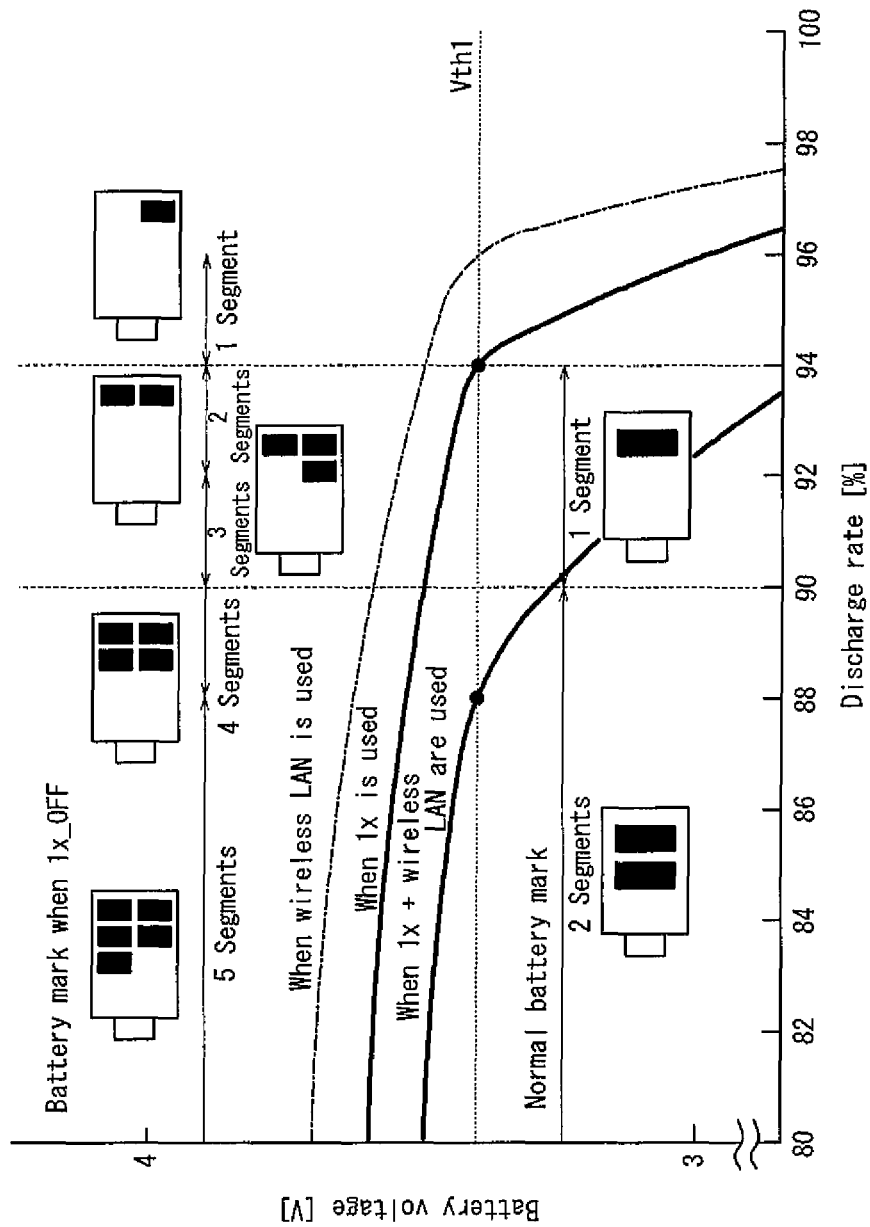
FIG. 15 shows a display example of remaining battery level of the mobile communication terminal in accordance with a fourth embodiment of the present invention.

FIG. 15 illustrates a display example of the remaining battery level of the mobile communication terminal in accordance with the fourth embodiment of the present invention. A display example of the remaining battery level on the display unit 106 is described below by using the mobile communication terminal 100 shown in FIG. 1 as an example.

As described above, in the mobile communication terminal 100 in accordance with the present embodiment, when a sub-communication unit is added, the main communication unit is disabled (OFF) depending on the battery voltage. In addition, since the main communication unit and the sub-communication unit correspond respectively to the independent communication systems, when the remaining battery level is enough, the main communication unit and the sub-communication unit can simultaneously perform communication. As is obvious, only the main communication unit can communicate when an SD wireless card 200 is not inserted into the SD I/F 107.

Consequently, in the present embodiment, when only the main communication unit is used or both the main communication unit and the sub-communication unit are simultaneously used, as a normal battery mark based on the main communication unit, the control unit 111 controls to display a battery mark with three to one segment(s) in the pictogram area of the display unit 106 depending on the remaining battery level. On the other hand, when only the sub-communication unit is used, the control unit 111 changes the display to the battery mark for 1x_OFF based on the sub-communication unit and displays, depending on the remaining battery level, battery mark with eight to one segment(s) in the pictogram area of the display unit 106 in a manner of display different from the normal battery mark. In other words, as the battery mark based on the sub-communication unit, the remaining level mark indicating the remaining battery level is displayed in more segmentalized manner than that of the battery mark based on the main communication unit. Thus in the mobile communication terminal 100 shown in FIG. 1, the control unit 111 and the display unit 106 constitute a display change unit.

FIG. 15 shows the case where 1x is used as an aspect in which only the main communication unit is used, the case where 1x+wireless LAN are used as an aspect in which the main communication unit and the sub-communication unit are used and the case where wireless LAN is used as an aspect in which only the sub-communication unit is used. Further, in FIG. 15, a normal battery mark corresponds to the case where 1x is used and the battery mark for 1x_OFF corresponds to the case where wireless LAN is used.

Here, in the case where 1x is used, the battery voltage declines based on the discharge rate characteristics for the use of 1x. Therefore, in this case, a battery mark of 3 segments (not shown) is displayed at the battery voltage corresponding to the discharge rate of 0-70%, a battery mark of 2 segments is displayed at the battery voltage corresponding to the discharge rate of 70-90%, and a battery mark of one segment is displayed at the battery voltage corresponding from the discharge rate of 90% to Vth1, which is the operating voltage limit of the terminal. Then when the battery voltage reaches Vth1, power supply of the terminal is turned off.

Further, when wireless LAN is used during 1x_OFF, in the same manner, the battery voltage declines based on the discharge rate characteristics for the use of wireless LAN. Therefore, in this case, for example, a battery mark of 8 segments (not shown) is displayed at the battery voltage corresponding to the discharge rate of 0-58%, a battery mark of 7 segments (not shown) is displayed at the battery voltage corresponding to the discharge rate of 58-70%, a battery mark of 6 segments (not shown) is displayed at the battery voltage corresponding to the discharge rate of 70-80%, a battery mark of 5 segments is displayed at the battery voltage corresponding to the discharge rate of 80-88%, a battery mark of 4 segments is displayed at the battery voltage corresponding to the discharge rate of 88-90%, a battery mark of 3 segments is displayed at the battery voltage corresponding to the discharge rate of 90-92%, a battery mark of 2 segments is displayed at the battery voltage corresponding to the discharge rate of 92~94%, and a battery mark of 1 segment is displayed at the battery voltage corresponding from the discharge rate of 94% to the battery voltage of Vth1. Then when the battery voltage reaches Vth1, power supply of the terminal is turned off.

In this manner, in the mobile communication terminal 100 in accordance with the present embodiment, when wireless LAN is used during 1x_OFF, even if discharge rate reaches the level (remaining battery level) that turns off the power supply of the terminal when 1x is used, the battery voltage has not yet reached Vth1. Therefore, a battery mark corresponding to the remaining battery level is displayed for the use of wireless LAN without turning off the power supply of the terminal. It should be noted that the relationship between the battery voltage corresponding to the above mentioned aspects of the main communication unit and the sub-communication unit and the battery mark to be displayed is stored in the ROM 109 or the RAM 110 beforehand, and based on the battery voltage detected by the battery voltage detection unit 104, display of the battery mark on the display unit 106 is controlled by the control unit 111. Thus, it is preferable that, in accordance with the operation of the above mentioned embodiment, the battery mark is changed from the display based on the main communication unit (1x) to that based on the sub-communication unit (wireless LAN) in the case where the main communication unit is disabled. Of course battery mark may be selected after determining which of the main communication unit and the sub-communication unit is operating.

As mentioned above, in the present embodiment, when only the sub-communication unit is used, battery mark is changed to that based on the sub-communication unit. Therefore the user can expect that the power will be turned off due to decline in the battery voltage, which enables the user to avoid unexpected circumstances such as abrupt power off, and thus user convenience can be improved.

It should be noted that the present invention is not limited to the above mentioned embodiments, and various modifications and changes are available. For example, the communication system by the main communication unit is not limited to the system performing data reception of cdma 2000 1x or BCMCS, and may be other wireless communication systems, and the sub-system by the sub-communication system is not limited to wireless LAN and may be any communication system that is different from the main system. Further, the number of sub-communication systems is not limited to one, and the present invention can effectively be applied when a plurality of sub-communication units using a different communication system can be connected. Moreover, the external apparatus is not limited to an SD card, and can be an apparatus and the like capable of connecting with USB.

The invention claimed is:

1. A mobile communication terminal, comprising: a first wireless communication unit corresponding to a first wireless communication system; an interface capable of detachably connecting an external apparatus; a determination unit for determining whether the external apparatus connected to the interface corresponds to a second wireless communication system and is a second wireless communication unit that consumes less power than the first wireless communication unit; a battery voltage detection unit for detecting battery voltage of a power supply unit containing a battery; and a control unit for controlling the first wireless communication unit to be in a disabled state when the first wireless communication unit is communicating and the battery voltage detected by the battery voltage detection unit is equal to or less than a first predetermined value, in a case where the determination unit determines that the second wireless communication unit is connected, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

2. The mobile communication terminal according to claim 1, wherein the control unit controls the first wireless communication unit to be in the disabled state without terminating an application by which the first wireless communication unit is communicating.

3. The mobile communication terminal according to claim 2, wherein the control unit controls, after controlling the first wireless communication unit to be in the disabled state without terminating the application by which the first wireless communication unit is communicating, so that the communication by the application is performed by using the second wireless communication unit.

4. The mobile communication terminal according to claim 1, further comprising
a display change unit for changing to a display screen indicating that the first wireless communication unit cannot be used when the control unit controls the first wireless communication unit to be in the disabled state.

5. The mobile communication terminal according to claim 4, wherein the display change unit changes the display screen so that an activation display of an application that cannot be used unless the first wireless communication unit is used is not displayed.

6. The mobile communication terminal according to claim 4, wherein the display change unit changes an activation display of an application that cannot be used unless the first wireless communication unit is used to a display indicating not selectable.

7. The mobile communication terminal according to claim 4, wherein the display change unit changes the display screen so that the activation display of the application that cannot be used unless the first wireless communication unit is used is replaced by an activation display of an application capable of being executed by the second wireless communication unit.

8. The mobile communication terminal according to claim 1, further comprising:
a power supply operation unit for ON and OFF operations of power supply; and
a display unit for displaying an screen to select either to put the first wireless communication unit into an enabled state or to turn off the power supply when the power supply operation unit is operated in a state where the control unit controls the first wireless communication unit to be in the disabled state.

9. The mobile communication terminal according to claim 8, further comprising
a detection unit for detecting whether or not the battery is being charged, wherein the control unit controls the first wireless communication unit to be in the enabled state when it is selected to put the first wireless communication unit into an enabled state, and when the battery voltage detected by the battery voltage detection unit is equal to or less than the second predetermined value which is higher than the first predetermined value in a state where the detection unit is detecting charging, the display unit displays a message indicating that the first wireless communication unit is controlled to be in the disabled state if the charging is discontinued.

10. The mobile communication terminal according to claim 9, wherein when the battery voltage detected by the battery voltage detection unit exceeds the second predetermined value in the state where the detection unit is detecting charging, the display unit displays a message indicating the first wireless communication unit is not controlled to be in the disabled state even if the charging is discontinued.

11. The mobile communication terminal according to claim 1, wherein the first wireless communication unit is controlled to be in an enabled state when the battery voltage detected by the battery voltage detection unit exceeds a third predetermined value which is higher than the first predetermined value in a state where the first wireless communication unit is controlled to be in the disabled state by the control unit.

12. The mobile communication terminal according to claim 1, further comprising
a display change unit for changing a battery mark indicating a remaining battery level from a battery mark based on the first wireless communication unit to a battery mark based on the second wireless communication, when the first wireless communication unit is controlled to be in the disabled state by the control unit.

13. The mobile communication terminal according to claim 12, wherein, as the battery mark based on the second wireless communication unit, the display change unit displays a remaining level mark indicating a remaining battery level in a more segmentalized display manner than the battery mark based on the first wireless communication unit.

14. A mobile communication terminal, comprising: a first wireless communication unit corresponding to a first wireless communication system; an interface capable of detachably connecting a second wireless communication unit corresponding to a second wireless communication system and consuming less power than the first wireless communication unit; a battery voltage detection unit for detecting battery voltage of a power supply unit containing a battery; and a control unit for controlling the first wireless communication unit to be in a disabled state when the first and the second wireless communication units are communicating and the battery voltage detected by the battery voltage detection unit is equal to or less than a fourth predetermined value, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

15. The mobile communication terminal according to claim 14, wherein the control unit controls the first wireless communication unit to start a standby processing of the first wireless communication system in a case where the battery voltage detected by the battery voltage detection unit is equal to or greater than a fifth predetermined value which is higher than the fourth predetermined value when communication at the second wireless communication unit is completed.

16. The mobile communication terminal according to claim 14, wherein when the first wireless communication unit is performing audio communication, the control unit controls the first wireless communication unit to be in a disabled state in a case where a call processing to a corresponding party of the audio communication is performed by use of the second wireless communication unit and a response to the call is detected.

17. The mobile communication terminal according to claim 14, wherein when the first wireless communication unit is performing audio communication, the control unit controls the first wireless communication unit to be in a disabled state in a case where a call processing to a corresponding party of the audio communication is performed by use of the second wireless communication unit and a predetermined period of time passes from the call.

18. The mobile communication terminal according to claim 14, further comprising
a display change unit for changing a display screen to indicate that the first wireless communication unit cannot be used when the control unit controls the first wireless communication unit to be in the disabled state.

19. The mobile communication terminal according to claim 18, wherein the display change unit changes the display screen so that an activation display of an application that cannot be used unless the first wireless communication unit is used is not displayed.

20. The mobile communication terminal according to claim 18, wherein the display change unit changes an activation display of an application that cannot be used unless the first wireless communication unit is used to a display indicating not selectable.

21. The mobile communication terminal according to claim 18, wherein the display change unit changes the display screen so that an activation display of an application that cannot be used unless the first wireless communication unit is used is replaced by an activation display of an application capable of being executed by the second wireless communication unit.

22. The mobile communication terminal according to claim 14, further comprising:
a power supply operation unit for ON and OFF operations of power supply; and
a display unit for displaying a screen to select either to put the first wireless communication unit into an enabled state or to turn off the power supply when the power supply operation unit is operated in a state where the control unit controls the first wireless communication unit to be in the disabled state.

23. The mobile communication terminal according to claim 22, further comprising
a detection unit for detecting whether or not the battery is being charged, wherein
the control unit controls the first wireless communication unit to be in the enabled state when it is selected to put the first wireless communication unit into the enabled state, and
when the battery voltage detected by the battery voltage detection unit is equal to or less than a sixth predetermined value which is higher than the fourth predetermined value in a state where the detection unit is detecting charging, the display unit displays a message indicating that the first wireless communication unit is controlled to be in the disabled state if the charging is discontinued.

24. The mobile communication terminal according to claim 23, wherein when the battery voltage detected by the battery voltage detection unit exceeds the sixth predetermined value in the state where the detection unit is detecting charging, the display unit displays a message indicating that the first wireless communication unit is not controlled to be in the disabled state even if the charging is discontinued.

25. The mobile communication terminal according to claim 14, wherein the first wireless communication unit is controlled to be in an enabled state when the battery voltage detected by the battery voltage detection unit exceeds a seventh predetermined value which is higher than the fourth predetermined value in a state where the first wireless communication unit is controlled to be in the disabled state by the control unit.

26. The mobile communication terminal according to claim 14, further comprising
a display change unit for changing a battery mark indicating a remaining battery level from a battery mark based on the first wireless communication unit to a battery mark based on the second wireless communication, when the first wireless communication unit is controlled to be in the disabled state by the control unit.

27. The mobile communication terminal according to claim 26, wherein, as the battery mark based on the second wireless communication unit, the display change unit displays a remaining level mark indicating a remaining battery level in a more segmentalized display manner than the battery mark based on the first wireless communication unit.

28. A mobile communication terminal, comprising: a first wireless communication unit corresponding to a first wireless communication system; an interface capable of detachably connecting an external apparatus; a determination unit for determining whether the external apparatus connected to the interface corresponds to a second wireless communication system and is a second wireless communication unit that consumes less power than the first wireless communication unit; a battery voltage detection unit for detecting battery voltage of a power supply unit containing a battery; and a control unit for controlling the first wireless communication unit to be in a disabled state when the first wireless communication unit is communicating mainly for reception and the battery voltage detected by the battery voltage detection unit is equal to or less than an eighth predetermined value, in a case where the determination unit determines that the second wireless communication unit is connected, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

29. The mobile communication terminal according to claim 28, further comprising
a display change unit for changing a display screen to indicate that the first wireless communication unit cannot be used when the control unit controls the first wireless communication unit to be in the disabled state.

30. The mobile communication terminal according to claim 29, wherein the display change unit changes the display screen so that an activation display of an application that cannot be used unless the first wireless communication unit is used is not displayed.

31. The mobile communication terminal according to claim 29, wherein the display change unit changes an activation display of an application that cannot be used unless the first wireless communication unit is used to a display indicating not selectable.

32. The mobile communication terminal according to claim 29, wherein the display change unit changes the display screen so that an activation display of an application that cannot be used unless the first wireless communication unit is used is replaced by an activation display of an application capable of being executed by the second wireless communication unit.

33. The mobile communication terminal according to claim 28, further comprising:
a power supply operation unit for ON and OFF operations of power supply; and
a display unit for displaying a screen to select either to put the first wireless communication unit into an enabled state or to turn off the power supply when the power supply operation unit is operated in a state where the control unit controls the first wireless communication unit to be in the disabled state.

34. The mobile communication terminal according to claim 33, further comprising
a detection unit for detecting whether or not the battery is being charged, wherein
the control unit controls the first wireless communication unit to be in the enabled state when it is selected to put the first wireless communication unit into the enabled state,
when the battery voltage detected by the battery voltage detection unit is equal to or less than a ninth predetermined value which is higher than the eighth predetermined value in a state where the detection unit is detecting charging, the display unit displays a message indicating that the first wireless communication unit is controlled to be in the disabled state if the charging is discontinued.

35. The mobile communication terminal according to claim 34, wherein when the battery voltage detected by the battery voltage detection unit exceeds the ninth predetermined value in the state where the detection unit is detecting charging, the display unit displays a message indicating that the first wireless communication unit is not controlled to be in the disabled state even if the charging is discontinued.

36. The mobile communication terminal according to claim 28, wherein the first wireless communication unit is controlled to be in the enabled state when the battery voltage detected by the battery voltage detection unit exceeds a tenth predetermined value which is higher than the eighth predetermined value in the state where the first wireless communication unit is controlled to be in the disabled state by the control unit.

37. The mobile communication terminal according to claim 28, further comprising
a display change unit for changing a battery mark indicating a remaining battery level from a battery mark based on the first wireless communication unit to a battery mark based on the second wireless communication, when the first wireless communication unit is controlled to be in the disabled state by the control unit.

38. The mobile communication terminal according to claim 37, wherein, as the battery mark based on the second wireless communication unit, the display change unit displays a remaining level mark indicating a remaining battery level in a more segmentalized display manner than the battery mark based on the first wireless communication unit.

39. A mobile communication terminal, comprising: a first wireless communication unit corresponding to a first wireless communication system; an interface capable of detachably connecting a second wireless communication unit corresponding to a second wireless communication system and consuming less power than the first wireless communication unit; a battery voltage detection unit for detecting battery voltage of a power supply unit containing a battery; and a control unit for controlling the first wireless communication unit to be in a disabled state when the battery voltage detected by the battery voltage detection unit is equal to or less than an eleventh predetermined value, in a case where the first wireless communication unit is in a standby state of the first wireless communication system and the second wireless communication unit is communicating, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

40. The mobile communication terminal according to claim 39, wherein the control unit controls the first wireless communication unit to start a standby processing of the first wireless communication system in the case where the battery voltage detected by the battery voltage detection unit is equal to or greater than the eleventh predetermined value when communication at the second wireless communication unit is completed.

41. The mobile communication terminal according to claim 39, further comprising
a display change unit for changing a display screen to indicate that the first wireless communication unit cannot be used when the control unit controls the first wireless communication unit to be in the disabled state.

42. The mobile communication terminal according to claim 41, wherein the display change unit changes the display screen so that an activation display of an application that cannot be used unless the first wireless communication unit is used is not displayed.

43. The mobile communication terminal according to claim 41, wherein the display change unit changes an activation display of an application that cannot be used unless the first wireless communication unit is used to a display showing not selectable.

44. The mobile communication terminal according to claim 41, wherein the display change unit changes the display screen so that an activation display of an application that cannot be used unless the first wireless communication unit is used is replaced by an activation display of an application capable of being executed by the second wireless communication unit.

45. The mobile communication terminal according to claim 39, further comprising:
a power supply operation unit for ON and OFF operations of power supply; and
a display unit for displaying an screen to select either to put the first wireless communication unit into an enabled state or to turn off the power supply when the power supply operation unit is operated in a state where the control unit controls the first wireless communication unit to be in the disabled state.

46. The mobile communication terminal according to claim 45, further comprising
a detection unit for detecting whether or not the battery is being charged, wherein the control unit controls the first wireless communication unit to be in the enabled state when it is selected to put the first wireless communication unit into the enabled state;
when the battery voltage detected by the battery voltage detection unit is equal to or less than the eleventh predetermined value in a state where the detection unit is detecting charging, the display unit displays a message indicating that the first wireless communication unit is controlled to be in the disabled state if the charging is discontinued.

47. The mobile communication terminal according to claim 46, wherein when the battery voltage detected by the battery voltage detection unit exceeds the eleventh predetermined value in the state where the detection unit is detecting charging, the display unit displays a message indicating that the first wireless communication unit is not controlled to be in the disabled state even if the charging is discontinued.

48. The mobile communication terminal according to claim 39, wherein the first wireless communication unit is controlled to be in the enabled state when the battery voltage detected by the battery voltage detection unit exceeds the eleventh predetermined value in the state where the first wireless communication unit is controlled to be in the disabled state by the control unit.

49. The mobile communication terminal according to claim 39, further comprising
a display change unit for changing a battery mark indicating a remaining battery level from a battery mark based on the first wireless communication unit to a battery mark based on the second wireless communication, when the first wireless communication unit is controlled to be in the disabled state by the control unit.

50. The mobile communication terminal according to claim 49, wherein, as the battery mark based on the second wireless communication unit, the display change unit displays a remaining level mark indicating a remaining battery level in a more segmentalized display manner than the battery mark based on the first wireless communication unit.

51. A control method of a mobile communication terminal comprising a first wireless communication unit corresponding to a first wireless communication system, an interface capable of detachably connecting an external apparatus and a power supply unit containing a battery, comprising: a determination step of determining whether the external apparatus connected to the interface corresponds to a second wireless communication system and is a second wireless communication unit that consumes less power than the first wireless communication unit; a communication state detection step of detecting a communication state of the first wireless communication unit; a battery voltage detection step of detecting battery voltage of the power supply unit; and a control step of controlling the first wireless communication unit to be in a disabled state when it is detected that the first wireless communication unit is communicating at the communication state detection step and the battery voltage detected at the battery voltage detection step is equal to or less than a first predetermined value, in a case where it is determined that the second wireless communication unit is connected at the determination step, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

52. The control method of the mobile communication terminal according to claim 51, wherein at the control step, the first wireless communication unit is controlled to be in the disabled state without terminating an application by which the first wireless communication unit is communicating.

53. The control method of the mobile communication terminal according to claim 52, wherein at the control step, after controlling the first wireless communication unit to be in the disabled state without terminating the application by which the first wireless communication unit is communicating, the communication by the application is controlled to be performed by using the second wireless communication unit.

54. A control method of a mobile communication terminal comprising a first wireless communication unit corresponding to a first wireless communication system, a second wireless communication unit corresponding to a second wireless communication system and detachably connected via an interface and a power supply unit containing a battery, comprising: a communication state detection step of detecting a communication state of the first and the second wireless communication units; a battery voltage detection step of detecting battery voltage of the power supply unit; and a control step of controlling the first wireless communication unit to be in a disabled state when it is detected that the first and the second wireless communication units are communicating at the communication state detection step and the battery voltage detected at the battery voltage detection step is equal to or less than a fourth predetermined value, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

55. The control method of the mobile communication terminal according to claim 54, wherein at the control step, the first wireless communication unit is controlled to start a standby processing of the first wireless communication system in a case where the battery voltage detected by the battery voltage detection step is equal to or greater than a fifth predetermined value which is higher than the fourth predetermined value when it is detected that the second wireless communication unit completes communication at the communication state detection step.

56. The control method of the mobile communication terminal according to claim 54, wherein when it is detected that the first wireless communication unit is performing audio communication at the communication state detection step, the first wireless communication unit is controlled to be in a disabled state at the control step in a case where a call processing to a corresponding party of the audio communication is performed by use of the second wireless communication unit and a response to the call is detected.

57. The control method of the mobile communication terminal according to claim 54, wherein when it is detected that the first wireless communication unit is performing audio communication at the communication state detection step, the first wireless communication unit is controlled to be in a disabled state at the control step in a case where a call processing to a corresponding party of the audio communication is performed by use of the second wireless communication unit and a predetermined period of time passes from the call.

58. A control method of a mobile communication terminal comprising a first wireless communication unit corresponding to a first wireless communication system, an interface capable of detachably connecting an external apparatus and a power supply unit containing a battery, comprising: a determination step of determining whether the external apparatus connected to the interface corresponds to a second wireless communication system and is a second wireless communication unit that consumes less power than the first wireless communication unit; a communication state detection step of detecting a communication state of the first wireless communication unit; a battery voltage detection step of detecting battery voltage of the power supply unit; and a control step of controlling the first wireless communication unit to be in a disabled state when it is detected that the first wireless communication unit is communicating mainly for reception at the communication state detection step and the battery voltage detected at the battery voltage detection step is equal to or less than a eighth predetermined value, in a case where it is determined that the second wireless communication unit is connected at the determination step, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

59. A control method of a mobile communication terminal comprising a first wireless communication unit corresponding to a first wireless communication system, a second wireless communication unit corresponding to a second wireless communication system and detachably connected via an interface and a power supply unit containing a battery, comprising the steps of: a communication state detection step of detecting a communication state of the first and the second wireless communication units; a battery voltage detection step of detecting battery voltage of the power supply unit; and a control step of controlling the first wireless communication unit to be in a disabled state when the battery voltage detected at the battery voltage detection step is equal to or less than an eleventh predetermined value in a case where it is detected that the first wireless communication unit is in a standby state of the first wireless communication system and the second wireless communication unit is communicating at the communication state detection step, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

60. The control method of the mobile communication terminal according to claim 59, wherein the first wireless communication unit is controlled to start a standby processing of the first wireless communication system at the control step in a case where the battery voltage detected by the battery voltage detection unit is greater than the eleventh predetermined value when it is detected that the second wireless communication unit completes communication at the communication state detection step.

61. A mobile communication terminal, comprising: a first wireless communication unit corresponding to a first wireless communication system; a second wireless communication unit corresponding to a second wireless communication system and consuming less power than the first wireless communication unit; a battery detection unit for detecting a remaining battery level; and a control unit for controlling the first wireless communication unit to be in a disabled state when the first and the second wireless communication units are communicating and the remaining battery level detected by the battery detection unit is equal to or less than a predetermined value, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

62. A mobile communication terminal, comprising: a first wireless communication unit corresponding to a first wireless communication system; a second wireless communication unit corresponding to a second wireless communication system and consuming less power than the first wireless communication unit; a battery detection unit for detecting a remaining battery level; and a control unit for controlling the first wireless communication unit to be in a disabled state when the remaining battery level detected by the battery detection unit is equal to or less than a predetermined value, in a case where the first wireless communication unit is in a standby state of the first wireless communication system and the second wireless communication unit is communicating, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

63. A control method of a mobile communication terminal comprising a first wireless communication unit corresponding to a first wireless communication system, a second wireless communication unit corresponding to a second wireless communication system and a power supply unit containing a battery, comprising: a communication state detection step of detecting a communication state of the first and the second wireless communication units; a battery detection step of detecting a remaining battery level; and a control step of controlling the first wireless communication unit to be in a disabled state when it is detected that the first and the second wireless communication units are communicating at the communication state detection step and the remaining battery level detected at the battery detection step is equal to or less than a predetermined value, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

64. A control method of a mobile communication terminal comprising a first wireless communication unit corresponding to a first wireless communication system, a second wireless communication unit corresponding to a second wireless communication system and a power supply unit containing a battery, comprising the steps of: a communication state detection step of detecting a communication state of the first and the second wireless communication units; a battery detection step of detecting a remaining battery level; and a control step of controlling the first wireless communication unit to be in a disabled state when the remaining battery level detected at the battery detection step is equal to or less than a predetermined value in a case where it is detected that the first wireless communication unit is in a standby state of the first wireless communication system and the second wireless communication unit is communicating at the communication state detection step, wherein when the battery voltage is determined to be equal to or less than a second predetermined value, the control unit notifies a user of termination of standby of the first wireless communication unit, and wherein when the battery voltage is thereafter determined to be not equal to or less than the second predetermined value the control unit restarts standby of the first wireless communication unit.

* * * * *